US012709834B2

(12) United States Patent
Kim et al.

(10) Patent No.: US 12,709,834 B2
(45) Date of Patent: Aug. 18, 2026

(54) DRYER

(71) Applicant: LG Electronics Inc., Seoul (KR)

(72) Inventors: Hyojun Kim, Seoul (KR); Hongjun Cho, Seoul (KR); Hyuksoo Lee, Seoul (KR); Yangguk Hwang, Seoul (KR); Hyeonjoong Kim, Seoul (KR); Oshin Kwon, Seoul (KR); Minji Kim, Seoul (KR); Yeonju Lee, Seoul (KR)

(73) Assignee: LG Electronics Inc., Seoul (KR)

( * ) Notice: Subject to any disclaimer, the term of this patent is extended or adjusted under 35 U.S.C. 154(b) by 805 days.

(21) Appl. No.: 17/467,010

(22) Filed: Sep. 3, 2021

(65) Prior Publication Data

US 2022/0074112 A1 Mar. 10, 2022

(30) Foreign Application Priority Data

Sep. 4, 2020 (KR) ........................ 10-2020-0113131
Sep. 4, 2020 (KR) ........................ 10-2020-0113132
Sep. 4, 2020 (KR) ........................ 10-2020-0113133

(51) Int. Cl.
*D06F 58/20* (2006.01)
*D06F 58/02* (2006.01)
(Continued)

(52) U.S. Cl.
CPC .............. *D06F 58/20* (2013.01); *D06F 58/02* (2013.01); *D06F 58/08* (2013.01); *H02K 1/30* (2013.01);
(Continued)

(58) Field of Classification Search
None
See application file for complete search history.

(56) References Cited

U.S. PATENT DOCUMENTS 3,060,593 A * 10/1962 Flora ........................ D06F 58/08 310/83
4,489,507 A 12/1984 Kawai
(Continued)

FOREIGN PATENT DOCUMENTS

CN 1211651 A 3/1999
CN 1721615 A 1/2006
(Continued)

OTHER PUBLICATIONS

Extended European Search Report in European Appln. No. 21194756. 9, Dec. 8, 2021, 9 pages.
(Continued)

*Primary Examiner* — Jason Lau
(74) *Attorney, Agent, or Firm* — Fish & Richardson P.C.

(57) ABSTRACT

A dryer includes a drum, a fixing panel that is spaced apart from a rear cover of the drum and defines a panel through-hole, a stator disposed in the panel through-hole and a rotor configured to rotate relative to the stator, a power transmitter including a housing fixed to the fixing panel, a first shaft located at the housing and coupled to the rotor, a second shaft located at the housing and coupled to the rear cover, and an interlocking gear located in the housing and configured to transmit rotational force from the first shaft to the second shaft, and a driving unit bracket that is disposed at the panel through-hole and defines positions for installing the stator and the housing such that a rotation axis of the first shaft extends through a rotation center of the rotor.

19 Claims, 16 Drawing Sheets

(51) Int. Cl.

| | |
|---|---|
| ***D06F 58/08*** | (2006.01) |
| ***H02K 1/30*** | (2006.01) |
| ***H02K 7/08*** | (2006.01) |
| ***H02K 7/116*** | (2006.01) |
| ***H02K 7/14*** | (2006.01) |
| ***H02K 9/06*** | (2006.01) |
| ***H02K 21/22*** | (2006.01) |

(52) U.S. Cl.

CPC ............ *H02K 7/085* (2013.01); *H02K 7/116* (2013.01); *H02K 7/14* (2013.01); *H02K 9/06* (2013.01); *H02K 21/22* (2013.01)

(56) References Cited

U.S. PATENT DOCUMENTS

| | | | |
|---|---|---|---|
| 4,910,979 | A | 3/1990 | Burk |
| 2005/0217139 | A1 | 10/2005 | Hong |
| 2018/0094376 | A1 | 4/2018 | Kitayama |

FOREIGN PATENT DOCUMENTS

| | | | | |
|---|---|---|---|---|
| CN | 101069335 | A | | 11/2007 |
| CN | 201254659 | Y | | 6/2009 |
| CN | 103282574 | A | | 9/2013 |
| CN | 203212887 | U | | 9/2013 |
| CN | 204138927 | U | | 2/2015 |
| CN | 107237082 | A | | 10/2017 |
| CN | 208158298 | | | 11/2018 |
| CN | 110469637 | | | 11/2019 |
| CN | 110791933 | A | | 2/2020 |
| DE | 1410964 | | | 5/1971 |
| EP | 1282738 | | | 2/2003 |
| EP | 3617394 | | | 3/2020 |
| JP | 2000-000396 | A | | 1/2000 |
| JP | 2000-325693 | A | | 11/2000 |
| JP | 2003144789 | | | 5/2003 |
| JP | 2004041771 | | | 2/2004 |
| JP | 2006075417 | | | 3/2006 |
| JP | 2015-208499 | A | | 11/2015 |
| JP | 2018-063001 | A | | 4/2018 |
| JP | 2023-540341 | A | | 9/2023 |
| KR | 10-2000-0077232 | A | | 12/2000 |
| KR | 10-2001-0037517 | A | | 5/2001 |
| KR | 20010052443 | | | 6/2001 |
| KR | 10-2004-0036194 | A | | 4/2004 |
| KR | 10-2005-0051873 | A | | 12/2005 |
| KR | 20060004363 | | | 1/2006 |
| KR | 10-2006-0018731 | A | | 3/2006 |
| KR | 10-2006-0089074 | A | | 8/2006 |
| KR | 101249717 | | | 4/2013 |
| KR | 101639022 | B1 | * | 7/2016 |
| KR | 20200026077 | | | 3/2020 |
| KR | 10-2020-0065932 | A | | 6/2020 |
| KR | 20200065931 | | | 6/2020 |
| KR | 20200066169 | | | 6/2020 |
| WO | 2012/114752 | A1 | | 8/2012 |
| WO | WO2020111817 | | | 6/2020 |

OTHER PUBLICATIONS

Extended European Search Report in European Appln. No. 21194758.5, Dec. 23, 2021, 10 pages.

Extended European Search Report in European Appln. No. 21194763.5, Dec. 23, 2021, 10 pages.

International Search Report and Written Opinion in International Appln. No. PCT/KR2021/011904, dated Dec. 22, 2021, 8 pages.

International Search Report and Written Opinion in International Appln. No. PCT/KR2021/011905, dated Dec. 22, 2021, 9 pages.

International Search Report and Written Opinion in International Appln. No. PCT/KR2021/011907, dated Dec. 27, 2021, 9 pages.

Office Action in Japanese Appln. No. 2023-514984, dated Nov. 28, 2023, 7 pages (with English translation).

Notice of Allowance in Korean Appln. No. 10-2020-0113131, mailed on Oct. 15, 2024, 2 pages (with English translation).

Notice of Allowance in Korean Appln. No. 10-2020-0113132, mailed on Oct. 18, 2024, 2 pages (with English translation).

Notice of Allowance in Korean Appln. No. 10-2020-0113133, mailed on Oct. 9, 2024, 2 pages (with English translation).

Office Action in Chinese Appln. No. 202180054627.3, mailed on Apr. 22, 2025, 15 pages (with English translation).

Office Action in Chinese Appln. No. 202180054637.7, mailed on May 24, 2025, 24 pages (with English translation).

Notice of Allowance in Chinese Appln. No. 202180054627.3, mailed on Apr. 3, 2026, 7 pages (Official Copy Only).

Notice of Allowance in Chinese Appln. No. 202180054637.7, mailed on Feb. 10, 2026, 7 pages (Official Copy Only).

Office Action in Chinese Appln. No. 202180054625.4, mailed on Mar. 26, 2026, 13 pages (with English translation).

Action in Japanese Appln. No. 2024-209293, mailed on Mar. 3, 2026, 8 pages (with English translation).

* cited by examiner 36
353
351
322
32
321
5
D
6
41
4
153
155
324
158
157
159
233
23
21
22
651
345
312
313
17
311
123
126
127
128
X
Y
Z

DRYER

CROSS-REFERENCE TO RELATED APPLICATIONS

This application claims the benefit of Korean Patent Application Nos. 10-2020-0113131, 10-2020-0113132, and 10-2020-0113133, filed on Sep. 4, 2020, respectively, the disclosures of which are hereby incorporated by reference as if fully set forth herein.

TECHNICAL FIELD

The present disclosure relates to a dryer, and more particularly, to a dryer with an improved power transmission mechanism between a drum and a motor rotating the motor.

BACKGROUND

A dryer is a device for drying an object by supplying hot air into an object container.

For example, drum dryers may include an object container shaped into a cylindrical drum, and hot air may be introduced into the drum during rotation of the drum. Particularly, a drum dryer with a drum rotating roughly around a horizontal axis is often used as a household dryer.

The drum dryer may use a motor for rotating the drum, and the driving force of the motor may be transmitted to the drum through a power transmitter such as a belt to rotate the drum. The rotation axis of the motor may be different from the rotation axis of the drum of a belt type dryer.

In some cases, power loss may occur due to the power transmitter such as a belt, and a separate space may be provided inside a case to mount the power transmitter such as a motor and a belt.

Drum washing machines may include a direct connection (or direct drive) drum type that is different from the belt type. For instance, in the direct connection type, the rotation axis of the motor may be coaxial with that of the drum, and the stator of the motor may be mounted on the rear or lower wall of a tub. A motor used in a washing machine may be called a direct drive (DD) motor, and the washing machine may be called a DD washing machine.

The direct connection type may have a wide variety of advantages compared to the belt type. For example, a drum driving revolutions per minute (RPM) and a drum torque may be variously changed and controlled in various environments. In some cases, a drum rotation direction or a drum rotation angle may be controlled. Further, reduced power loss leads to energy saving.

A washer dryer may include a motor provided in a tub, thereby facilitating application of a drum-motor direct connection structure. In some cases, a pure dryer without a washing function may not include a tub for fixing a motor, and thus it may not be easy to implement a direct connection-type dryer in the pure dryer.

SUMMARY

The present disclosure describes a dryer with a driving unit that can reduce and transfer the rotation speed of a rotor to a drum, in which the rotation center of the rotor is located on a concentric axis with the rotation center of the drum.

The present disclosure also describes a dryer that can minimize the volume of a driving unit.

The present disclosure also describes a dryer with an improved flow path of air supplied to a drum.

The present disclosure also describes a dryer with an improved cooling flow path of a motor that drives a drum.

The present disclosure also describes a dryer with an improved fixing structure for fixing a motor and a power transmitter.

The present disclosure also describes a dryer that can reduce vibrations generated from a power transmitter that transfers the power of a motor.

According to one aspect of the subject matter described in this application, a dryer includes a drum a drum body that defines a space configured to receive clothes, a front cover that defines a front surface of the drum body and a drum inlet that is in communication with the space of the drum bod, and a rear cover that defines a rear surface of the drum body, a fixing panel that is spaced apart from the rear cover and defines a panel through-hole, a motor including a stator disposed in the panel through-hole and a rotor configured to rotate relative to the stator, a power transmitter including a housing fixed to the fixing panel, a first shaft located at the housing and coupled to the rotor, a second shaft located at the housing and coupled to the rear cover, and an interlocking gear located in the housing and configured to decelerate a rotational speed of the first shaft and to transmit rotational force from the first shaft to the second shaft, and a driving unit bracket that is disposed at the panel through-hole and defines positions for installing the stator and the housing such that a rotation axis of the first shaft extends through a rotation center of the rotor.

Implementations according to this aspect can include one or more of the following features. For example, the driving unit bracket can include a ring portion that overlaps with a circumferential surface of the panel through-hole, that is fixed to the fixing panel, and that supports the stator, and a housing coupling portion that protrudes from an inside of the ring portion and supports an exterior of the housing. In some examples, the ring portion can define a plurality of coupling holes that face the circumferential surface of the panel through-hole, and the stator can pass through the fixing panel and is fixed to the plurality of coupling holes. In some examples, the ring portion can include a protrusion that extends through the panel through-hole and protrudes toward the fixing panel.

In some implementations, the housing can include a plurality of fixing protrusions that are located at an outer circumferential surface of the housing and extend in a radial direction with respect to a center of the housing. The housing coupling portion can include a plurality of housing coupling jaws that protrude toward a center of the ring portion, where each of the plurality of housing coupling jaws is located at a position corresponding to one of the plurality of fixing protrusions. In some examples, each of the plurality of housing coupling jaws can define a housing coupling hole, and each of the plurality of fixing protrusions defines a fixing hole coupled with one of the housing coupling holes by a coupling member.

In some examples, the plurality of housing coupling jaws can include a plurality of locking protrusions, respectively, where each of the plurality of locking protrusions extends in an insertion direction of the housing. Each of the plurality of fixing protrusions can be supported by one of the plurality of locking protrusions and extends in a direction crossing the one of the plurality of locking protrusions. In some examples, each of the plurality of locking protrusions can define a locking groove that receives one of the plurality of fixing protrusions. In some examples, each of the plurality of fixing protrusions defines a fixing groove that receives one of the plurality of housing coupling jaws.

In some implementations, the plurality of locking protrusions can define a plurality of locking grooves, respectively, where each of the plurality of locking grooves receives one of the plurality of fixing protrusions, and the plurality of fixing protrusions can define a plurality of fixing grooves, respectively, where each of the plurality of fixing grooves is coupled to one of the plurality of locking grooves. In some examples, at least one of the plurality of locking grooves or at least one of the plurality of fixing grooves defines an inclined surface at an entrance thereof. In some examples, one of the plurality of locking grooves and one of the plurality of fixing grooves can be configured to insert into each other based on the housing rotating about the center of the housing.

In some cases, a number of the plurality of fixing protrusions can be greater than or equal to three, and a number of the plurality of housing coupling jaws is greater than or equal to three.

In some implementations, the fixing panel can be located between the driving unit bracket and the stator, and the driving unit bracket and the fixing panel can support the stator. In some examples, the power transmitter can further include a driving gear defined at an end of the first shaft and configured to transmit the rotational force to the interlocking gear, and a driven gear defined at an end of the second shaft and configured to receive the rotational force from the interlocking gear. The interlocking gear can include a first gear meshed with the driving gear and configured to be rotated by the driving gear, and a second gear meshed with the driven gear and configured to rotate coaxially with the first gear, where a diameter of the second gear is less than a diameter of the first gear.

In some examples, the first shaft, the second shaft, and the rotor can be coaxial. In some examples, a peripheral surface of the housing includes a flat portion and a curved portion that extends from the flat portion, and the driving unit bracket can define a recess corresponding to the flat portion and the curved portion of the housing. In some examples, the driving unit bracket can further define a bracket through-hole within the recess that is in communication with the panel through-hole.

In some implementations, the dryer can include a sealing that is located at the driving unit bracket or the fixing panel and that covers the circumferential surface of the panel through-hole. In some examples, the power transmitter can be located between the sealing and the motor along the rotation axis of the rotor.

Additional aspects will be set forth in part in the description which follows and, in part, will be apparent from the description, or can be learned by practice of the presented implementations of the disclosure.

BRIEF DESCRIPTION OF THE DRAWINGS

The accompanying drawings, which are included to provide a further understanding of the disclosure and are incorporated in and constitute a part of this application, illustrate implementation(s) of the disclosure and together with the description serve to explain the principle of the disclosure.

DETAILED DESCRIPTION

Reference will now be made in detail to an implementation of the present disclosure, examples of which are illustrated in the accompanying drawings. Wherever possible, the same reference numbers will be used throughout the drawings to refer to the same or like parts. Further, lest it should obscure the subject matter of the present disclosure, a detailed description of a known configuration or structure will not be provided.

One or more examples of a dryer will be described below in detail.

Figure 1:
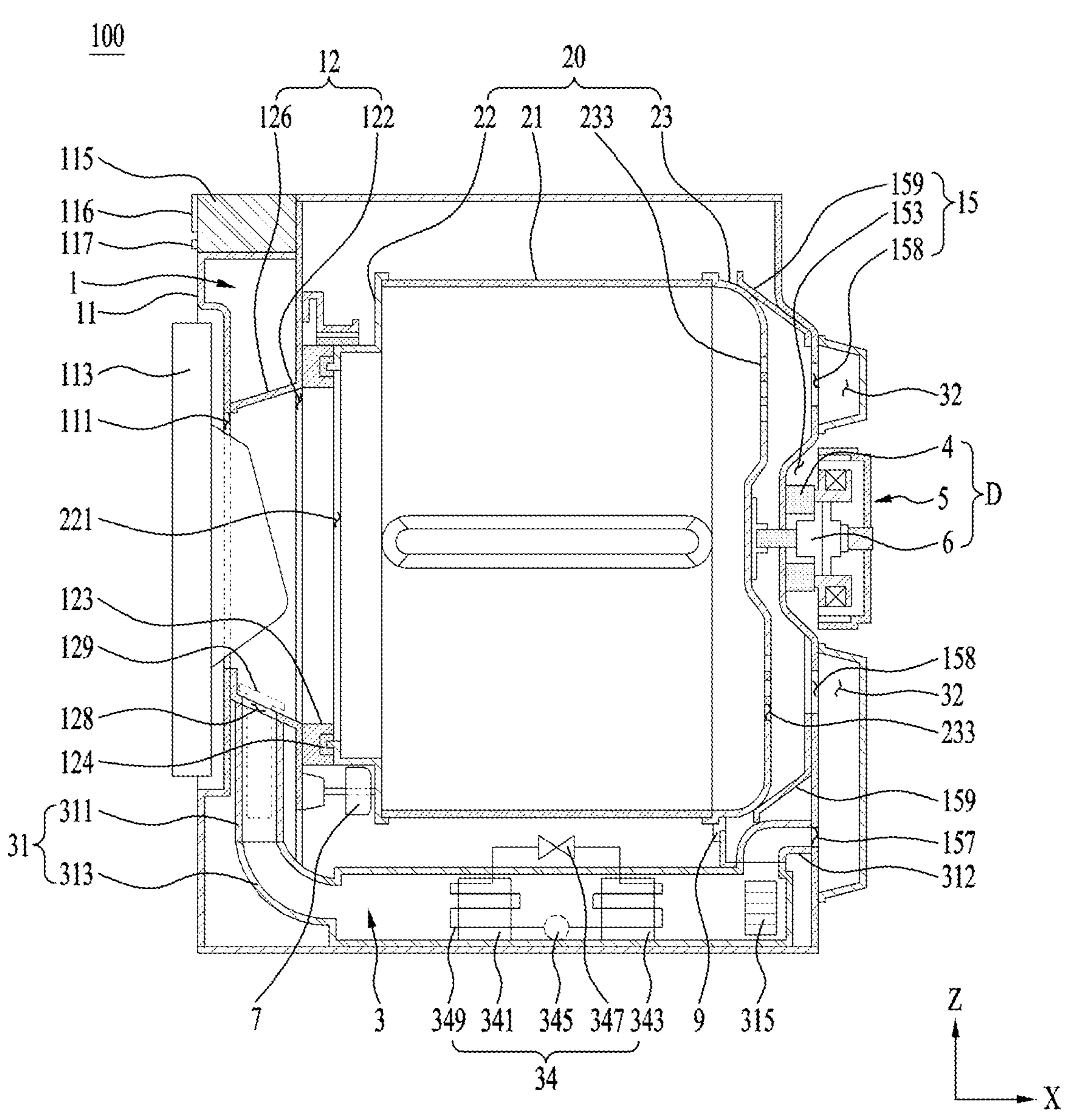
FIG. 1 is a sectional view illustrating an example of a dryer.
Figure 2:
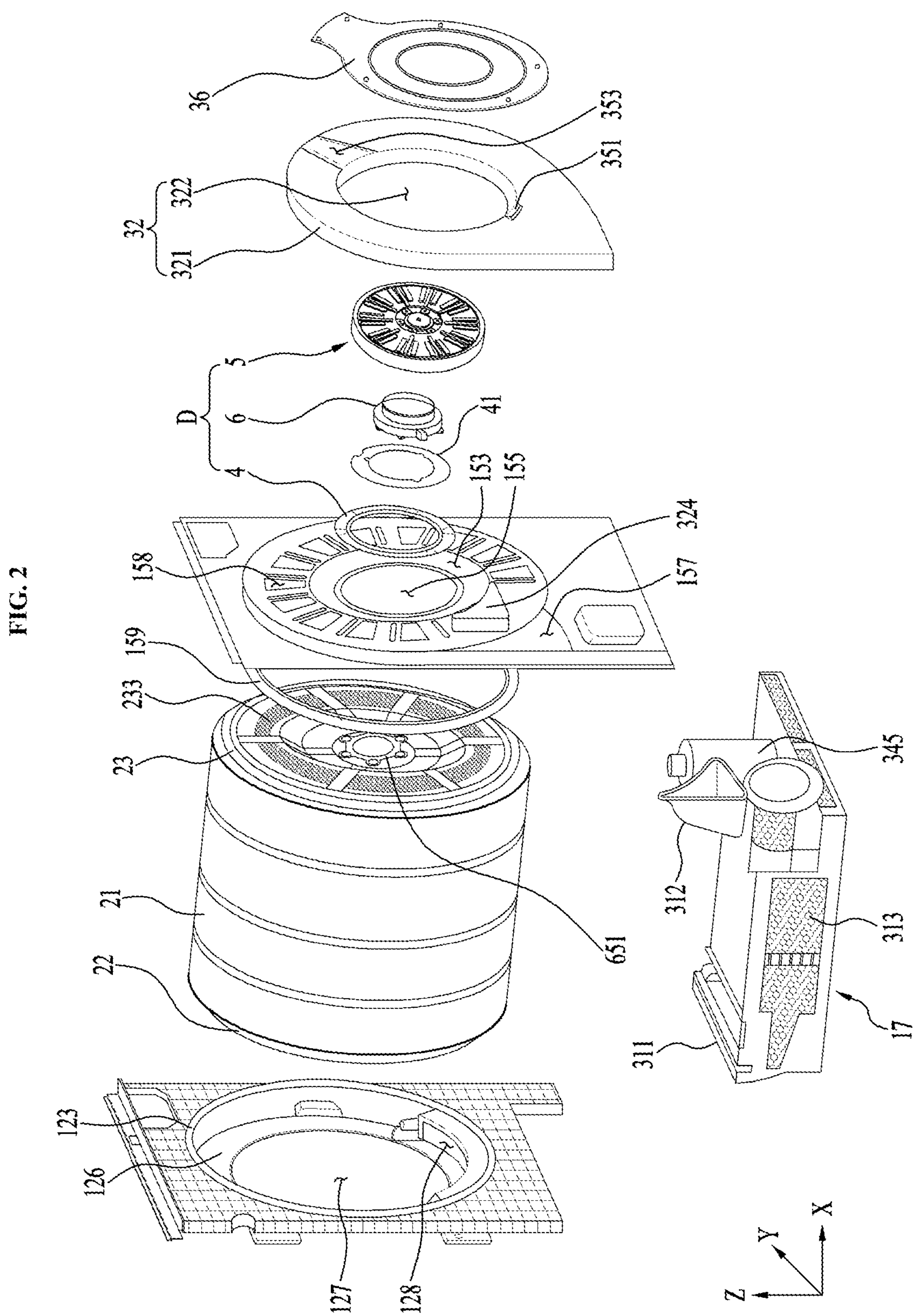
FIG. 2 is an exploded perspective view illustrating the dryer.

FIG. 1 is a sectional view illustrating an example of a dryer, and FIG. 2 is an exploded perspective view illustrating the dryer.

Referring to FIG. 1, a dryer 100 can include a cabinet 1, a drum 20 rotatably mounted in the cabinet 1 and providing a space for accommodating clothes (laundry or an object to be dried) therein, a supply 3 supplying hot dry air (air at a higher temperature than room temperature or air with higher dryness than the dryness of indoor air), and a driving unit D rotating the drum 20.

In some implementations, the cabinet 1 can include a front panel 11 forming the front surface of the dryer 100 and a base panel 17 forming the bottom surface of the dryer 100. The front panel 11 can define an inlet 111 communicating with the drum 20. The inlet 111 can be provided with a door 113, so that the inlet 111 is closed by the door 113.

The front panel 11 can be provided with a control panel 115, and the control panel 114 can be provided with an input unit 116 that receives a control command from a user and a display 117 that outputs information such as control commands selectable by the user. The input unit 116 can include a power supply requester requesting supply of power to the dryer 100, a course input unit that allows the user to select an intended course from among a plurality of courses, and an execution requester requesting starting of the user-selected course.

The drum 20 can be shaped into a hollow cylinder. In the illustrated example of FIG. 1, the drum 20 includes a cylindrical drum body 21 opened at the front and rear surfaces thereof, a front cover 22 forming the front surface of the drum body 21, and a rear cover 23 forming the rear surface of the drum body 21. The front cover 22 can be provided with a drum inlet 221 that communicates the inside of the drum body 21 with the outside of the drum body 21.

The drum 20 can be rotatably fixed to at least one of a support panel 12 or a fixing panel 15. In the illustrated example of FIG. 1, the rear cover 23 is rotatably fixed to the fixing panel 15 through the driving unit D, and the front cover 22 is rotatably connected to the support panel 12.

The support panel 12 can be fixed to the cabinet 1 and disposed between the front panel 11 and the front cover 22. In the illustrated example of FIG. 1, the support panel 12 is fixed to the base panel 17 and disposed between the front panel 11 and the front cover 22. In this case, the rear surface (a surface facing the support panel 12) of the front panel 11 can be fixed to the support panel 12, and the bottom of the front panel 11 can be fixed to the base panel 17.

The support panel 12 can include a support panel through-hole 122, a drum connection body 123 connecting the support panel through-hole 122 to the drum inlet 221, and a panel connection body 126 connecting the support panel through-hole 122 to the inlet 111.

The support panel through-hole 122 can penetrate through the support panel 12, for communicating the inlet 111 with the drum inlet 221.

The drum connection body 123 can be provided as a pipe fixed to the rear surface of the support panel 12 (a surface facing the drum inlet 221 in a space provided by the support panel 12). The drum connection body 123 can have one end surrounding the support panel through-hole 122 and a free end supporting the front cover 22. That is, the free end of the drum connection body 123 can be inserted into the drum inlet 221 or contact a free end of the front cover 22 forming the drum inlet 221.

In the illustrated example of FIG. 1, the free end of the drum connection body 123 contacts the free end of the front cover 22. In this case, the drum connection body 123 can be provided with a ring-shaped damper (connection damper) 124. The connection damper 124 is a device that can minimize the risk of separating the drum inlet 221 from the drum connection body 123 (the risk of leaking air inside the drum 20 into the cabinet 1), when the drum 20 rotates or vibrates.

The connection damper 124 can be formed of a compressible material (a material with a volume increasing or decreasing by an external force). In this case, the connection damper 124 can be kept in a compressed state between the free end of the drum connection body 123 and an edge of the drum inlet 221 (the free end of the front cover 22). This is for minimizing separation of the drum inlet 221 from the drum connection body 123, when the drum 20 vibrates between the support panel 12 and the fixing panel 15. A felt manufactured by compressing fibers can be an example of the material of the connection damper 124.

The panel connection body 126 can be provided as a pipe fixed to the front surface of the support panel 12 (the surface facing the front panel 11 in the space provided by the support panel 12). The panel connection body 126 can have one end surrounding the support panel through-hole 122, and the other end connected to the inlet 111. Accordingly, clothes introduced to the inlet 111 can enter the drum body 21 through the panel connection body 126, the support panel through-hole 122, the drum connection body 123, and the drum inlet 221.

The fixing panel 15 can be fixed to the cabinet 1 at a position apart from the rear cover 23. In the illustrated example of FIG. 1, the fixing panel 15 is fixed to the base panel 17 to form the rear surface of the dryer 100 (the rear surface of the cabinet 1).

Referring to FIG. 2, the fixing panel 15 can be provided with a driving unit mounting recess 153 defining a space for mounting the driving unit D therein. The driving unit mounting recess 153 can be a recess concavely bent from the fixing panel 15 toward the rear cover 23 of the drum 20. The fixing panel 15 is provided with a fixing panel through-hole 155 through which a rotation shaft of the drum 20 passes. The fixing panel through-hole 155 can be located in the driving unit mounting recess 153.

The support panel 12 can be provided with a drum exhaust port (a first exhaust port) 128 penetrating through the panel connection body 126, and the fixing panel 15 can be provided with a panel exhaust port (a second exhaust port) 157 and a supply port 158.

The supply port 158 can include a plurality of supply holes which penetrate through the fixing panel 15 and are arranged to surround the driving unit mounting recess 153 (the plurality of supply holes can form a ring surrounding the driving unit mounting recess 153).

As illustrated in FIG. 1, the supply 3 can include an exhaust duct 31 connecting the first exhaust port 128 and the second exhaust port 157 to each other, a supply duct 32 guiding air discharged from the second exhaust port 157 to the supply port 158, and a heat exchange unit 34 provided in the exhaust duct 31 to sequentially dehumidify and heat the air. A filter 129 can be provided in the first exhaust port 128, for filtering air flowing from the drum 20 to the exhaust duct 31.

The exhaust duct 31 may be provided to include a first duct 311 connected to the first exhaust port 128, a second duct 312 connected to the second exhaust port 157 and a third duct 313 connected between the first duct 311. The third duct 313 may be fixed to the base panel 17.

The exhaust duct 31 can be provided with a fan 315 blowing air inside the drum 20 to the second exhaust port 157. In the illustrated example of FIG. 1, the fan 315 is disposed between the heat exchange unit 34 and a second duct 312.

The heat exchange unit 34 can be provided with various devices capable of sequentially dehumidifying and heating the air introduced into the exhaust duct 31. In the illustrated example of FIG. 1, the heat exchange unit 34 is provided as a heat pump.

That is, the heat exchange unit 34 of FIG. 1 includes a first heat exchanger (a heat absorber) 341 removing moisture from the air introduced into the exhaust duct 31, and a second heat exchanger (a heater) 343 provided inside the exhaust duct 31 and heating the air that has passed through the heat absorber 341.

The heat absorber 341 and the heater 343 are sequentially arranged along an air flow direction and connected to each other through a refrigerant pipe 349 forming a refrigerant circulation path. A refrigerant flows along the refrigerant pipe 349 by a compressor 345 located outside the exhaust duct 31, and the refrigerant pipe 349 is provided with a pressure regulator 347 adjusting the pressure of the refrigerant flowing from the heater 343 to the heat absorber 341.

The heat absorber 341 is a device that can cool the air (evaporating the refrigerant) by transferring heat of the air introduced into the exhaust duct 31 to the refrigerant, and the heater 343 is a device that can heat the air (condensing the refrigerant) by transferring the heat of the refrigerant that has passed through the compressor 345 to the air.

As illustrated in FIG. 2, the supply duct 32 is a structure that can be fixed to the fixing panel 15 and that can guide the air discharged from the second exhaust port 157 to the supply port 158.

When the supply port 158 includes a plurality of supply holes arranged in the shape of a ring, the supply duct 32 can include a duct body 321 which is fixed to the fixing panel 15 and forms a flow path connecting the second exhaust port 157 and the supply port 158, and a rotor accommodator 322 penetrating through the duct body 321. The driving unit D fixed in the driving unit mounting recess 153 is exposed to the outside of the supply duct 32 by the rotor accommodator 322.

The drum 20 can include an air inlet 233 penetrating through the rear cover 23 to supply the air introduced into the cabinet 1 to the drum 20, and the fixing panel 15 can include a flow path generator 159 guiding the air discharged from the supply port 158 to the air inlet 233.

The air inlet 233 can be provided by arranging a plurality of holes penetrating through the rear cover 23 in the shape of a ring surrounding a rotation center of the drum 20. The flow path generator 159 can be provided as a pipe having one end (one end fixed to the fixing panel 15) surrounding the supply port 158 and the other end (one end contacting the drum 20) surrounding the air inlet 233. To minimize transfer of vibrations generated during rotation of the drum 20 to the fixing panel 15, the flow path generator 159 can be formed of a material having high elasticity (such as rubber).

The driving unit D can include a motor 5 fixed in the driving unit mounting recess 153 and a power transmitter 6 transferring power generated by the motor 5 to the drum 20.

To minimize the deformation of the fixing panel 15 caused by the weight of the driving unit D and an external force generated during operation of the driving unit D, a driving unit bracket 4 can be provided in the driving unit mounting recess 153, to provide a space in which the motor 5 is fixed. The driving unit bracket 4 can be formed into a metal ring (a stronger metal than the fixing panel 15) fixed in the driving unit mounting recess 153.

As illustrated in FIG. 2, the motor 5 can include a stator 51 fixed to the driving unit bracket 4 to form a rotating field, and a rotor 52 rotating by the rotating field.

The stator 51 can include a core 511 fixed to the driving unit bracket 4, a core through-hole 512 penetrating through the core 511, and electromagnets 513 arranged at equal intervals on a circumferential surface of the core 511.

The rotor 52 includes a disk-shaped rotor body 52*a*, a pipe-shaped rotor circumferential surface 52*b* fixed to the rotor body 52*a*, and a plurality of permanent magnets 525 fixed to the rotor circumferential surface 52*b*. The permanent magnets 525 are fixed to the rotor circumferential surface 52*b* in such a manner that N poles and S poles are alternately exposed.

The power transmitter 6 is used to decelerate or accelerate the rotational force of the motor 5 and transfer the decelerated or accelerated rotational force to the drum 20. Now, a detailed description will be given of the power transmitter 6 of the present disclosure with reference to the accompanying drawings.

Figure 3:
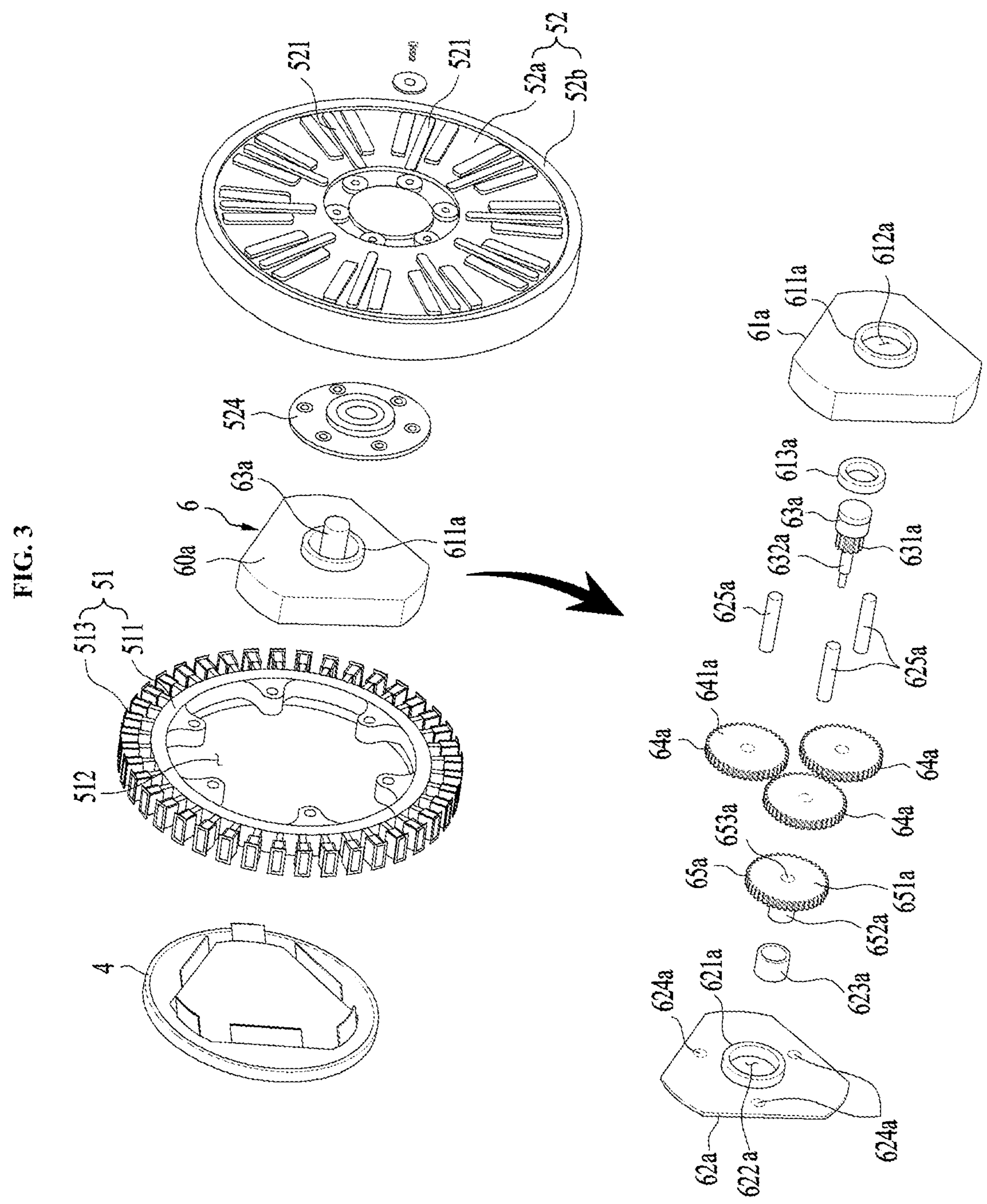
FIG. 3 is an exploded perspective view illustrating an example of a driving unit in the dryer.
Figure 4:
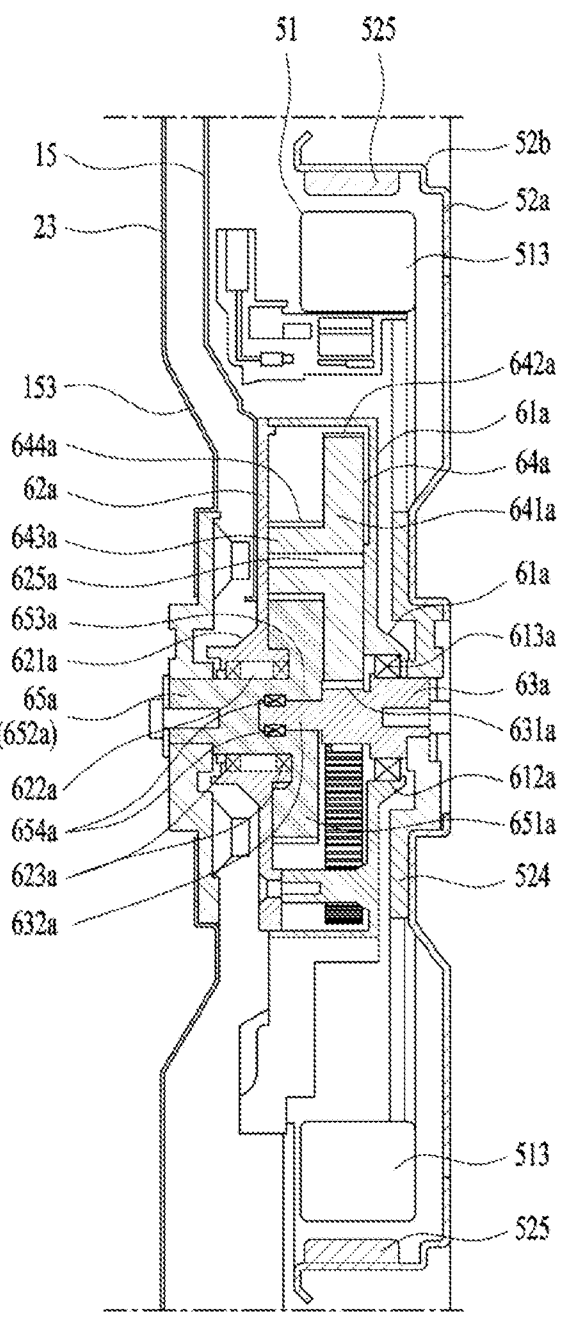
FIG. 4 is a sectional view illustrating the driving unit in the dryer.
Figure 5:
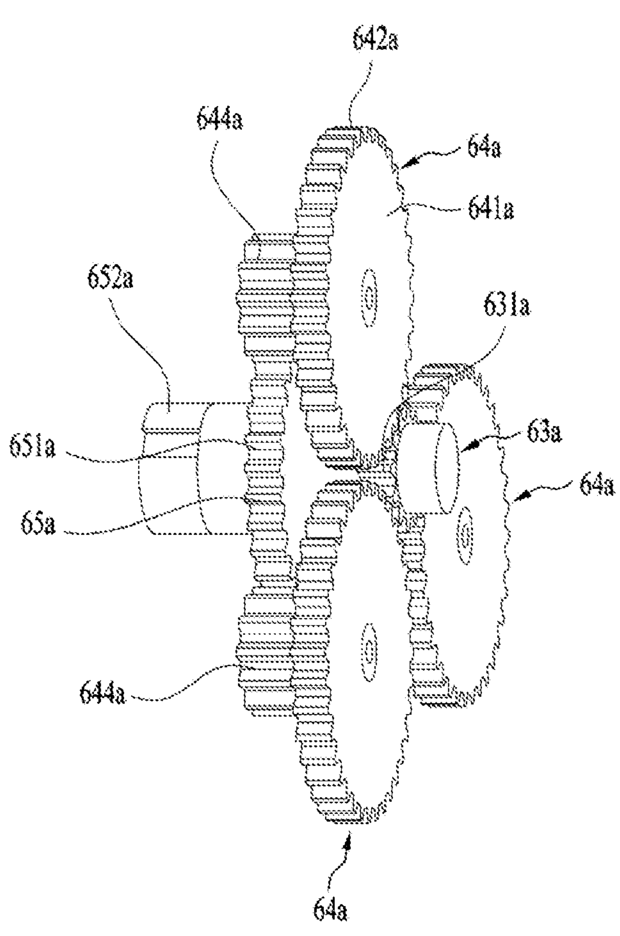
FIG. 5 is a perspective view illustrating an example of a gear unit in the driving unit.

Referring to FIGS. 3 and 4, in some implementations, the power transmitter 6 can include a housing 60*a* shaped into a hollow enclosure and fixed to the fixing panel 15, a first shaft 63*a* which has one end connected to the rotor body 52*a* and the other end located inside the housing 60*a* and on which a driving gear 631*a* is formed, a plurality of interlocking gears 64*a* meshed with the driving gear 631*a* and rotatably mounted in the housing 60*a*, and a driven gear 65*a* meshed with the interlocking gears 64*a* and including a second shaft 652*a* connected to the rear cover 23.

The first shaft 63*a* is used to transfer the rotational force of the rotor 52 to the interlocking gears 64*a*. The first shaft 63*a* can be provided with the driving gear 631*a* located inside the housing 60*a*. The first shaft 63*a* can extend from the driving gear 631*a* to the outside of the housing 60*a* and be connected to the rotor body 52*a*.

When the first shaft 63*a* is directly connected to the rotor body 52*a*, deformation can occur between the first shaft 63*a* and the rotor body 52*a*. To prevent the deformation of the rotor body 52*a*, the first shaft 63*a* can be fixed to the rotor body 52*a* through a fixing plate 524. The fixing plate 524 is fixed to the rotor body 52*a* to reinforce the strength of the rotor body 52*a*.

The driving gear 631*a* is provided, at an end thereof, with a driving gear shaft 632*a* inserted into a first shaft hole 653*a* of the driven gear 65*a*. The driving gear shaft 632*a* and the first shaft hole 653*a* are formed such that the rotation center of the first shaft 63*a* coincides with the rotation center of the driven gear 65*a*. That is, the driving gear 631*a* of the first shaft 63*a* and the second shaft 652*a* of the driven gear 65*a* can rotate on the same rotation axis.

The driven gear 65*a* can include a driven gear body 651*a* meshed with the interlocking gears 64*a*, the first shaft hole 653*a* formed at the center of the rotation axis of the driven gear body 651*a*, through which the driving gear shaft 632*a* of the first shaft 63*a* is inserted, and a first shaft hole bearing 654*a* provided in the first shaft hole 653*a* and rotatably supporting the driving gear shaft 632*a*.

The first shaft 63*a* and the driven gear 65*a* can be rotatably coupled with each other in a coaxial state by inserting the driving gear shaft 632*a* into the first shaft hole 653*a*. The coaxial coupling between the first shaft 63*a* and the driven gear 65*a* can prevent eccentricity during rotation of the first shaft 63*a* and the driven gear 65*a*.

The second shaft 652*a* is used to transfer the rotational force of the interlocking gears 64*a* to the drum 20. The second shaft 652*a* can be provided inside the housing 60*a* and extend from the driven gear 65*a* receiving power from the interlocking gears 64*a*. That is, the second shaft 652*a* can extend outward (i.e., in a direction to the drum 20) from the housing 60*a* around the rotation axis of the driven gear 65*a*.

The second shaft 652*a* can be integrally formed with the driven gear 65*a*. In some implementations, the second shaft 652*a* can define a concentric axis with the first shaft 63*a*. In some examples, where the second shaft 652*a* and the first shaft 63*a* define the concentric axis, vibrations generated in the power transmitter 6 can be minimized during rotation of the drum 20.

In some implementations, the housing 60*a* can be fixed to the fixing panel 15 and located in the core through-hole 512. The volume of the driving unit D can be minimized by minimizing the volume of the housing 60*a*.

The housing 60*a* can include a first housing 61*a* shaped into an enclosure having an open surface facing the fixing panel 15, and a second housing 62*a* closing the open surface of the first housing 61*a*.

The first housing 61*a* can be provided with a first shaft support 611*a* and a first shaft through-hole 612*a* penetrating through the first shaft support 611*a*. The first shaft 63*a* is inserted into the first shaft through-hole 612*a* to pass through the first housing 61*a*, and the first shaft 63*a* can be provided with a first shaft bearing 613*a* that fixes the first shaft 63*a* rotatably to the first housing 61*a*.

The first shaft support 611*a* can be provided in the form of a boss protruding from the first housing 61*a* toward the rotor body 52*a* or a boss protruding from the first housing 61*a* toward the second housing 62*a*.

When the first shaft support 611*a* is provided as a boss protruding from the first housing 61*a* toward the second housing 62*a* (protruding from the first housing 61*a* toward the center of the housing 60*a*), the volume of the housing 60*a* can be minimized (the volume of the driving unit D and the volume of the dryer 100 can be minimized).

The second housing 62*a* can be provided with a second shaft support 621*a* and a second shaft through-hole 622*a* penetrating through the second shaft support 621*a*. The second shaft 652*a* can pass through the second housing 62*a* through the second shaft through-hole 622*a*, and a second shaft bearing 623*a* rotatably fixed to the second housing 62*a* can be provided on the second shaft support 621*a*. Because the second shaft 652*a* is rotatably supported by the second shaft bearing 623*a*, the driven gear 65*a* can be rotatably supported inside the housing 60*a*.

The second shaft support 621*a* can be provided as a boss protruding from the second housing 62*a* toward the fixing panel through-hole 155 (toward the rear cover 23 of the drum 20).

A pair of first shaft bearings 613*a* can be arranged in parallel in the length direction of the first shaft 63*a* in the first shaft support 611*a*. A pair of second shaft bearings 623*a* can be arranged in parallel in the length direction of the second shaft 652*a* in the second shaft support 621*a*.

When at least two first shaft bearings 613*a* and at least two second shaft bearings 623*a* are provided, the eccentricity of the first shaft 63*a* and the second shaft 652*a* can be minimized during rotation of the rotor 52. That is, when a plurality of first shaft bearings 613*a* and a plurality of second shaft bearings 623*a* are provided, the eccentricity of the first shaft 63*a* and the second shaft 652*a* can be minimized during rotation of the first shaft 63*a* and the second shaft 652*a*.

If the driving unit D is large in volume, it is difficult to increase the number of bearings. Because the volume of the driving unit D can be minimized by a structure in which the housing 60*a* is located in the core through-hole 512 of the stator 51, and the boss structure of the first shaft support 611*a* protruding toward the center of the housing 60*a*, the number of first shaft bearings 613*a* and the number of second shaft bearings 623*a* can be increased.

To minimize the volume of the housing 60*a*, the diameters of the first housing 61*a* and the second housing 62*a* can be set to be different. That is, the diameter of the first housing 61*a* can be set smaller or larger than the diameter of the second housing 62*a*. To minimize the volume of the housing 60*a*, each of the first and second housings 61*a* and 62*a* can have a cylindrical shape corresponding to the core through-hole 512.

Alternatively, the outer shapes of the first housing 61*a* and the second housing 62*a* can correspond to the outer shape of the interlocking gears 64*a* according to the number of the interlocking gears 64*a* provided inside the housing 60*a*.

Specifically, a plurality of interlocking gears 64*a* can be provided around the first shaft 63*a* and the second shaft 652*a* coaxial with the first shaft 63*a*. When three or more interlocking gears 64*a* are provided, an outer surface formed by the interlocking gears 64*a* can be polygonal. Therefore, the housing 60*a* including the first housing 61*a* and the second housing 62*a* can be triangular for three interlocking gears 64*a* and rectangular for four interlocking gears 64*a*.

The housing 60*a* can be fixed by the driving unit bracket 4 coupled with the driving unit mounting recess 153 of the fixing panel 15. The driving unit bracket 4 can have an outer circumferential surface corresponding to the driving unit mounting recess 153 and an inner circumferential surface corresponding to the outer shape of the housing 60*a*.

The interlocking gears 64*a* are rotatably provided by connection shafts 625*a* located between the first housing 61*a* and the second housing 62*a*. As many connection shafts 625*a* as the number of interlocking gears 64*a* can be provided.

The power transmitter 6 will be described with the appreciation that there are three interlocking gears 64*a* apart from each other by 120 degrees and three connection shafts 625*a* apart from each other by 120 degrees, by way of example.

Each of the interlocking gears 64*a* can include a first body 641*a* rotatably coupled with a connection shaft 625*a* through the connection shaft 625*a*, a first gear 642*a* provided on the circumferential surface of the first body 641*a* and meshed with the driving gear 631*a* of the first shaft 63*a*, a second body 643*a* fixed to the first body 641*a* and having a smaller diameter than the first body 641*a*, and a second gear 644*a* provided on the circumferential surface of the second body 643*a* and coupled with the driven gear 65*a* provided with the second shaft 652*a*.

First connection shaft holes and second connection shaft hole (624*a*) for fixing the connection shafts 625*a* are formed at opposing positions in the first housing 61*a* and the second housing 62*a*, respectively. Bearings for rotatably supporting the connection shafts 625*a* can be provided in the first connection shaft holes and the second connection shaft holes 624*a*.

The second shaft 652*a* provided on the driven gear 65*a* can be inserted into the fixing panel through-hole 155 to connect to the rear cover 23 of the drum 20. To prevent the rotation of the second shaft 652*a* from damaging the rear cover 23, a separate shaft bracket to which one end of the second shaft 652*a* is fixed can be provided on the rear cover 23.

Referring to FIG. 4, the driving gear 631*a* of the first shaft 63*a* can be located in a space defined among the first gears 642*a*. Further, the free end of the first shaft support 611*a* can be inserted into the first shaft through-hole 612*a* formed at the center of the first housing 61*a* to pass through the housing 60*a*. This structure (the structure of the first shaft support 611*a* and the first housing 61*a*) can minimize the volume of the housing 60*a*.

To seal the fixing panel through-hole 155 (to prevent air supplied to the drum 20 from leaking to the outside of the cabinet 1), the driving unit bracket 4 or the fixing panel 15 can be further provided with a seal 41. When the driving unit bracket 4 is shaped into a ring surrounding the fixing panel through-hole 155, the ring-shaped core 511 is fixed to the driving unit bracket 4, and the housing 60*a* is located in the core through-hole 512, the seal 41 can be provided to seal the space defined between the driving unit bracket 4 and the second housing 62*a*.

Figure 6:
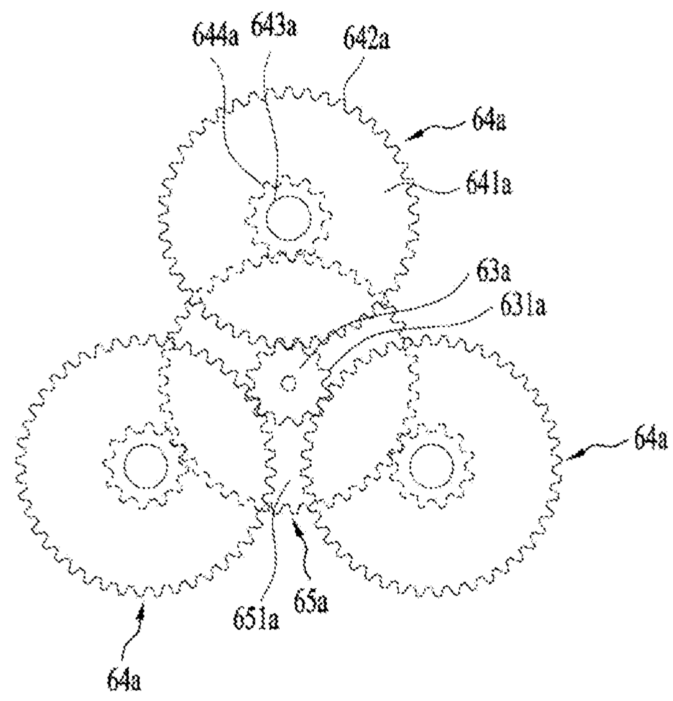
FIG. 6 is a simplified view illustrating the gear unit in the driving unit.
Figure 7:
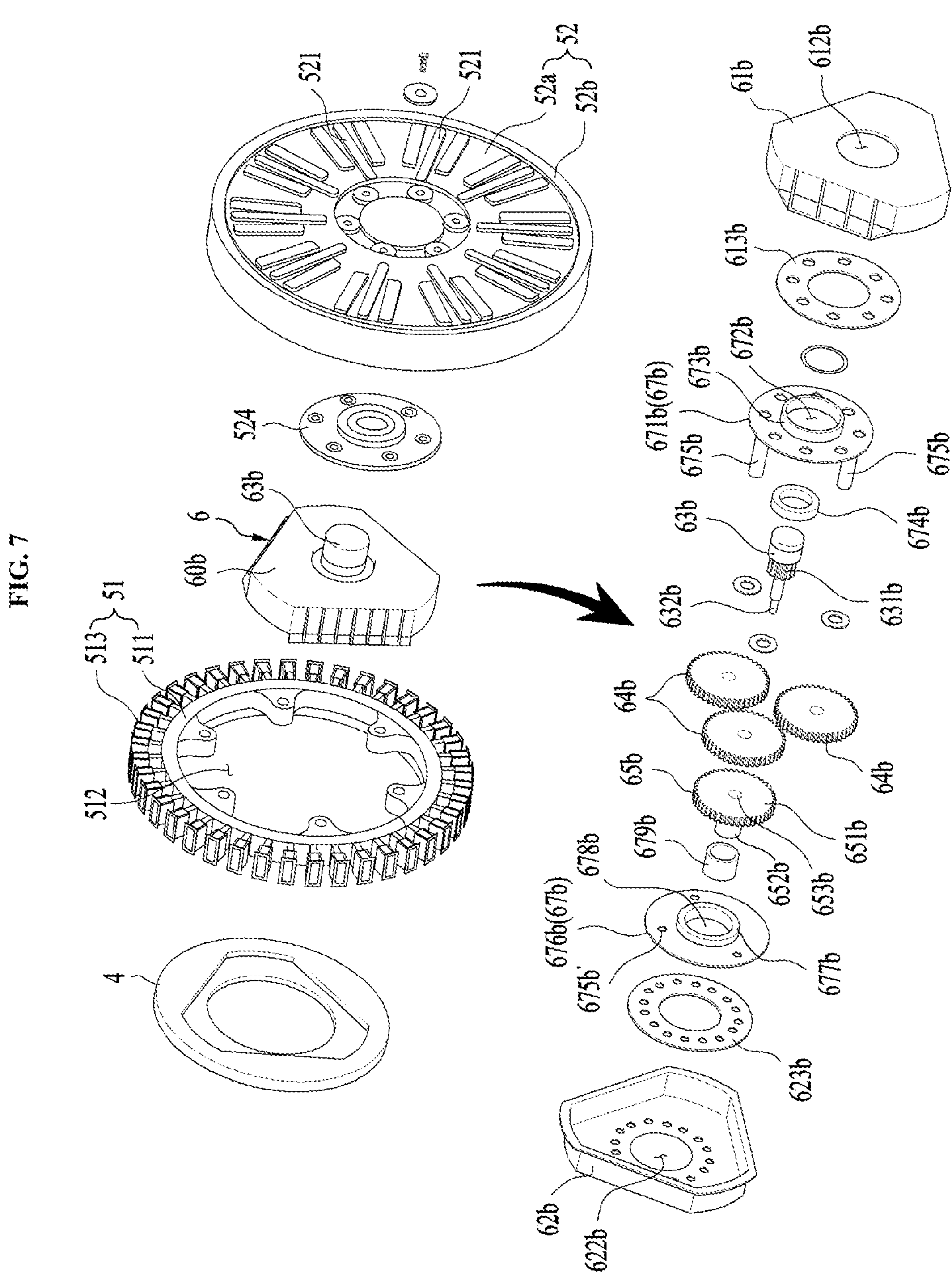
FIG. 7 is an exploded perspective view illustrating an example of a driving unit in a dryer.
Figure 8:
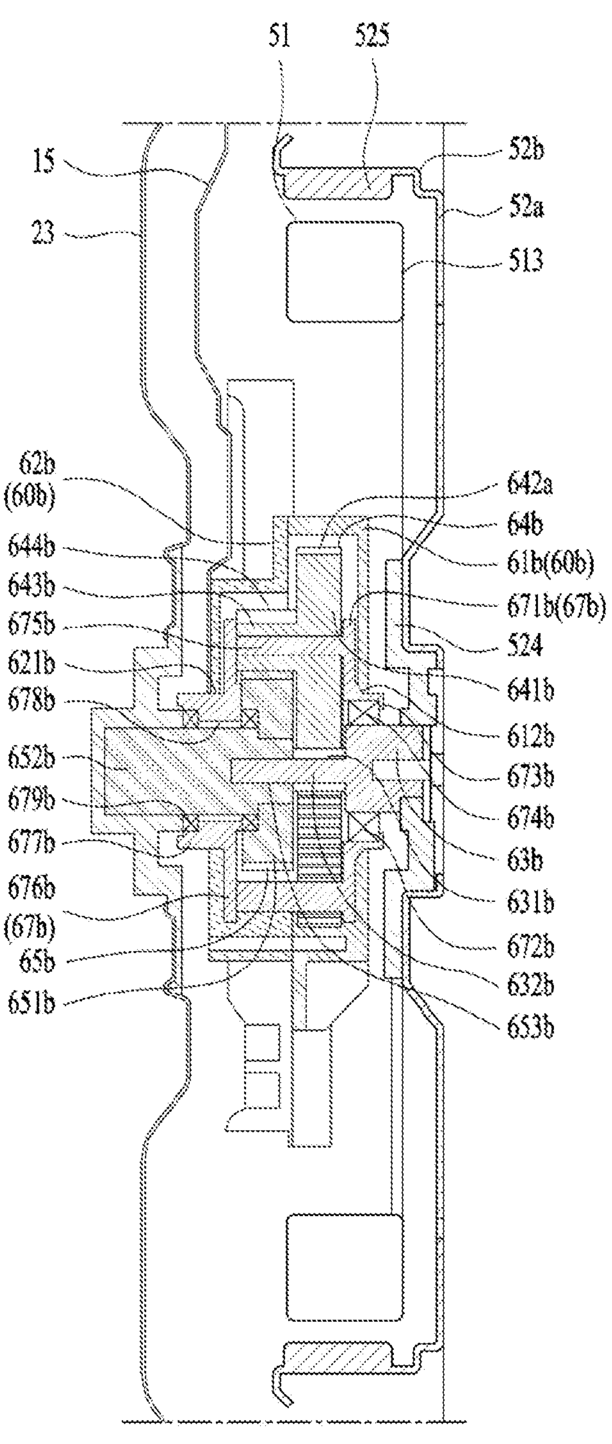
FIG. 8 is a sectional view illustrating the driving unit in the dryer of FIG. 7.

The driving unit D having the above-described structure operates as follows. Referring to FIG. 6, when the rotor 52 rotates clockwise, the first shaft 63*a* and the driving gear 631*a* also rotate clockwise.

When the driving gear 631*a* rotates clockwise, the interlocking gears 64*a* are rotated counterclockwise by the first gears 642*a*. When the first gears 642*a* rotate counterclockwise, the second gears 644*a* also rotate counterclockwise.

Because the interlocking gears 64*a* are rotatably supported inside the housing 60*a*, when the second gears 644*a* rotate counterclockwise, the driven gear 65*a* rotates clockwise.

The drum 20 and the driven gear 65*a* are coupled by the second shaft 652*a*. Therefore, the drum 20 rotates in the same direction as the rotor 52.

As illustrated in the drawing, the diameter of each of the first gears 642*a* can be set to be larger than the diameter of the driving gear 631*a*, and the diameter of the each of the second gears 644*a* can be set to be smaller than the diameter of each of the first gears 642*a*.

When the first gears 642*a*, the second gears 644*a*, and the driving gear 631*a* are provided as described above, the driving unit D can rotate the drum 20 with a smaller number of revolutions than that of the rotor 52. That is, the driving unit D can also serve as a decelerator.

As the driving gear 631*a* meshed with the first gears 642*a* of the interlocking gears 64*a* is even with the first gears 642*a*, and the driven gear 65*a* meshed with the second gears 644*a* of the interlocking gears 64*a* are even with the second gears 644*a*, the installation volume of the driving gear 631*a*, the interlocking gears 64*a*, and the driven gear 65*a* in the housing 60*a* can be minimized.

In some implementations, in the state where the driving gear 631*a* of the first shaft 63*a* is meshed with the first gears 642*a* of the interlocking gears 64*a*, and the driven gear 65*a* with the second shaft 652*a* formed thereon is meshed with the second gears 644*a* of the interlocking gears 64*a*, the first shaft 63*a* and the second shaft 652*a* can be coaxially coupled with each other. Therefore, when rotation of the first shaft 63*a* is transferred to the interlocking gears 64*a* and then to the driven gear 65*a*, eccentricity can be prevented between the first shaft 63*a* and the driven gear 65*a*.

With the attached drawings, another example of a power transmitter will be described below in detail.

Referring to FIGS. 7 to 10, in some implementations, the power transmitter 6 can include a housing 60*b* shaped into a hollow enclosure and fixed to the fixing panel 15, a first shaft 63*b* having one end connected to the rotor body 52*a* and the other end located inside the housing 60*b*, and including a driving gear 631*b* formed thereon, a plurality of interlocking gears 64*b* meshed with the driving gear 631*b* of the first shaft 63*b*, a driven gear 65*b* meshed with the interlocking gears 64*b* and including a second shaft 652*b* coupled to the rear cover 23, and a carrier 67*b* rotatably supporting the first shaft 63*b*, the interlocking gears 64*b*, and the driven gear 65*b* and fixed to the housing 60*b*.

In some implementations, the housing 60*b* can be fixed to the fixing panel 15 and located in the core through-hole 512. The volume of the driving unit D can be minimized by minimizing the volume of the housing 60*b*.

The housing 60*b* can include an enclosure-shaped first housing 61*b* having an opened surface facing the fixing panel 15, and a second housing 62*b* closing the open surface of the first housing 61*b*.

The first housing 61*b* can be provided with a first shaft through-hole 612*b* through which the first shaft 63*b* passes and is exposed. The first shaft 63*b* can be inserted into the first shaft through-hole 612*b* to pass through the first housing 61*b* and be coupled to the rotor body 52*a*.

The second housing 62*b* can be provided with a second shaft through-hole 622*b* through which the second shaft 652*b* passes and is exposed. The second shaft 652*b* can be inserted into the second shaft through-hole 622*b* to pass through the second housing 62*b* and be coupled to the rear cover 23 of the drum 20.

The housing 60*b* can be fixed by the driving unit bracket 4 coupled with the driving unit mounting recess 153 of the fixing panel 15. The driving unit bracket 4 can have an outer circumferential surface corresponding to the driving unit mounting recess 153 and an inner circumferential surface corresponding to the outer shape of the housing 60*b*.

The outer shapes of the first housing 61*b* and the second housing 62*b* can correspond to the outer shape of the interlocking gears 64*b* according to the number of interlocking gears 64*b* provided inside the housing 60*b*.

Specifically, a plurality of interlocking gears 64*b* can be provided around the first shaft 63*b* and the second shaft 652*b* coaxial with the first shaft 63*b*. When three or more interlocking gears 64*b* are provided, an outer surface formed by the interlocking gears 64*b* can be polygonal. Therefore, the housing 60*b* including the first housing 61*b* and the second housing 62*b* can be triangular for three interlocking gears 64*b* and rectangular for four interlocking gears 64*b*.

A ring-shaped first carrier damper 613*b* and a ring-shaped second carrier damper 623*b* can be provided respectively between the first housing 61*b* and the carrier 67*b* and between the second housing 62*b* and the carrier 67*b*, to prevent vibrations and noise generated during operation of the first shaft 63*b*, the interlocking gears 64*b*, and the driven gear 65*b* inside the carrier 67*b* from being transferred to the first housing 61*b* and the second housing 62*b*.

The carrier 67*b* is used to couple the first shaft 63*b*, the interlocking gears 64*b*, and the driven gear 65*b* with the housing 60*b*, simultaneously with rotatably supporting them.

The carrier 67*b* is used to fix the first shaft 63*b*, the interlocking gears 64*b*, and the driven gear 65*b* to the housing 60*b* by separately fastening them and thus preventing eccentricity between the first shaft 63*b* and the driven gear 65*b* provided with the second shaft 652*b*. The carrier 67*b* can improve the assembly of the power transmitter 6 and prevent eccentricity among the first shaft 63*b*, the interlocking gears 64*b*, and the driven gear 65*b*.

The carrier 67*b* includes a carrier cover 671*b* located facing the inner surface of the first housing 61*b* and rotatably supporting the first shaft 63*b*, and a carrier base 676*b* located facing the inner surface of the second housing 62*b* and rotatably supporting the second shaft 652*b*.

The interlocking gears 64*b* can be rotatably provided between the carrier cover 671*b* and the carrier base 676*b*. The carrier cover 671*b* is provided with a plurality of connection shafts 675*b* into which the interlocking gears 64*b* are rotatably inserted. A plurality of connection shaft grooves 675*b*' into which the connection shafts 675*b* are inserted are formed on the carrier base 676*b*.

The carrier cover 671*b* can be provided with a first shaft support 673*b* and a first shaft support hole 672*b* penetrating through the first shaft support 673*b*. The first shaft 63*b* is inserted into the first shaft through-hole 612*b* to pass through the carrier cover 671*b*, and the first shaft 63*b* can be provided with a first shaft bearing 674*b* rotatably fixing the first shaft 63*b* to the carrier cover 671*b*.

The first shaft support 673*b* can be provided in the form of a boss protruding from the carrier cover 671*b* toward the center of the carrier cover 671*ba* or a boss protruding from the carrier cover 671*b* toward the carrier base 676*b*.

When the first shaft support 673*b* is provided as a boss protruding from the carrier cover 671*b* toward the carrier base 676*b*, the volume of the carrier 67*b* can be minimized.

The carrier base 676*b* can be provided with a second shaft support 677*b* and a second shaft support hole 678*b* penetrating through the second shaft support 677*b*. The second shaft

652*b* passes through the carrier base 676*b* through the second shaft support hole 678*b*, and the second shaft support 677*b* can be provided with a second shaft bearing 679*b* rotatably fixing the second shaft 652*b* to the carrier base 676*b*.

The second shaft support 677*b* can be provided as a boss protruding from the carrier base 676*b* toward the second housing 62*b* or a boss protruding from the carrier base 676*b* toward the carrier cover 671*b*.

A pair of first shaft bearings 674*b* can be arranged in parallel in the length direction of the first shaft 63*b* in the first shaft support 673*b*. A pair of second shaft bearings 679*b* can be arranged in parallel in the length direction of the second shaft 652*b* in the second shaft support 677*b*.

When at least two first shaft bearings 674*b* and at least two second shaft bearings 679*b* are provided, the eccentricity of the first shaft 63*b* and the second shaft 652*b* can be minimized during rotation of the rotor 52. That is, when a plurality of first shaft bearings 674*b* and a plurality of second shaft bearings 679*b* are provided, the eccentricity of the first shaft 63*b* and the second shaft 652*b* can be minimized during rotation of the first shaft 63*b* and the second shaft 652*b*.

The first shaft 63*b* is used to transfer the rotational force of the rotor 52 to the interlocking gears 64*b*. The first shaft 63*b* can be provided with the driving gear 631*b* located inside the carrier 67*b*. The first shaft 63*b* can extend from the driving gear 631*b* located inside the carrier 67*b*, be rotatably supported by the first shaft support 673*b* of the carrier cover 671*b*, extend to the outside of the housing 60*b* through the first shaft through-hole 612*b*, and be coupled to the rotor body 52*a*.

When the first shaft 63*b* is directly coupled to the rotor body 52*a*, deformation can occur between the first shaft 63*b* and the rotor body 52*a*. To prevent deformation of the rotor body 52*a*, the first shaft 63*b* can be fixed to the rotor body 52*a* through the fixing plate 524. The fixing plate 524 can be fixed to the rotor body 52*a*, thereby reinforcing the strength of the rotor body 52*a*.

A driving gear shaft 632*b* is formed on an end of the driving gear 631*b*, to be inserted into a first shaft hole 653*b* of the driven gear 65*b*. The driving gear shaft 632*b* and the first shaft hole 653*b* are formed such that the rotation center of the first shaft 63*b* and the rotation center of the driven gear 65*b* coincide with each other. That is, the driving gear 631*b* of the first shaft 63*b* and the second shaft 652*b* of the driven gear 65*b* can rotate on the same rotation axis.

The driven gear 65*b* can include a driven gear body 651*b* meshed with the interlocking gears 64*b*, the first shaft hole 653*b* formed at the center of the rotation axis of the driven gear body 651*b* to allow the driving gear shaft 632*b* of the first shaft 63*b* to be inserted therethrough, and a first shaft hole bearing 654*b* provided in the first shaft hole 653*b* and rotatably supporting the driving gear shaft 632*b*.

As the driving gear shaft 632*b* is inserted into the first shaft hole 653*b*, the first shaft 63*b* and the driven gear 65*b* can be rotatably coupled with each other in a coaxial state. The coaxial coupling between the first shaft 63*b* and the driven gear 65*b* can prevent eccentricity during rotation of the first shaft 63*b* and the driven gear 65*b*.

The second shaft 652*b* is used to transfer the rotational force of the interlocking gears 64*b* to the drum 20. The second shaft 652*b* can be provided inside the carrier 67*b* and extend from the driven gear 65*b* receiving power from the interlocking gears 64*b*. That is, the second shaft 652*b* can be rotatably supported by the second shaft support 677*b* of the carrier base 676*b* and extend to the outside of the housing 60*b* through the second shaft through-hole 622*b*.

In some implementations, the second shaft 652*b* can define a concentric axis with the first shaft 63*b*. In some examples, where the second shaft 652*b* and the first shaft 63*b* form a concentric axis, vibrations generated in the power transmitter 6 can be minimized during rotation of the drum 20.

The second shaft 652*b* can extend outward from the carrier 67*b* (i.e., in a direction to the drum 20) around the rotation axis of the driven gear 65*b*. The second shaft 652*b* can be integrally formed with the driven gear 65*b*.

The second shaft 652*b* can extend from the driven gear 65*b* located inside the carrier 67*b*, be rotatably supported by the second shaft support 677*b* of the carrier base 676*b*, extend outward from the housing 60*b* through the second shaft through-hole 622*b*, and be coupled to the rear cover 23.

The interlocking gears 64*b* can be rotatably provided between the carrier cover 671*b* and the carrier base 676*b* by the connection shafts 675*b* provided in the carrier 67*b*. As many connection shafts 675*b* as the number of interlocking gears 64*b* can be provided.

The power transmitter will be described with the appreciation that there are three interlocking gears 64*b* apart from each other by 120 degrees and three connection shafts 675*b* apart from each other by 120 degrees, by way of example.

A plurality of connection shafts 675*b* extending toward the carrier base 676*b* can be provided on the carrier cover 671*b*. The connection shaft grooves 675*b*' into which the connection shafts 675*b* are inserted are formed on the carrier base 676*b*. Bearings for rotatably supporting the interlocking gears 64*b* can be provided between the connection shafts 675*b* and the interlocking gears 64*b*.

Each of the interlocking gears 64*b* can include a first body 641*b* rotatably coupled with a connection shaft 675*b* through the connection shaft 675*b*, a first gear 642*b* provided on the circumferential surface of the first body 641*b* and meshed with the driving gear 631*b* of the first shaft 63*b*, a second body 643*b* fixed to the first body 641*b* and having a smaller diameter than the first body 641*b*, and a second gear 644*b* provided on the circumferential surface of the second body 643*b* and coupled with the driven gear 65*b* provided with the second shaft 652*b*.

The second shaft 652*b* provided in the driven gear 65*b* can be inserted into the fixing panel through-hole 155 to connect to the rear cover 23 of the drum 20. To prevent the rotation of the second shaft 652*b* from damaging the rear cover 23, a separate shaft bracket to which one end of the second shaft 652*b* is fixed can be provided on the rear cover 23.

Figure 9:
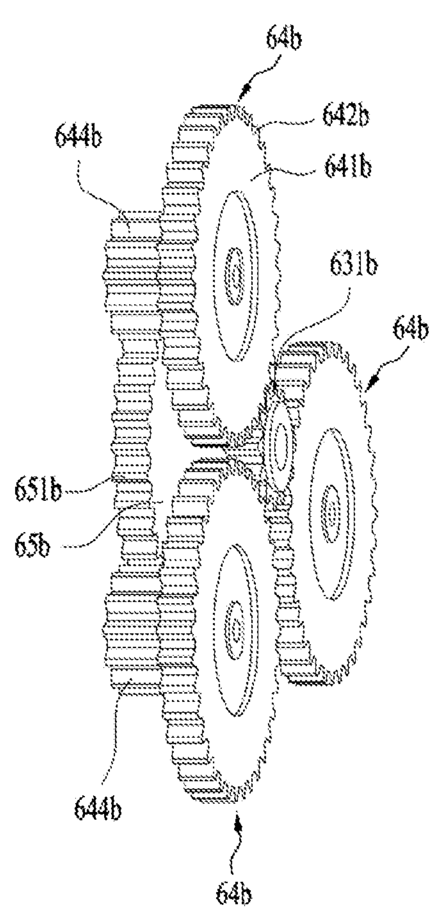
FIG. 9 is a perspective view illustrating an example of a gear unit in the driving unit of FIG. 7.
Figure 10:
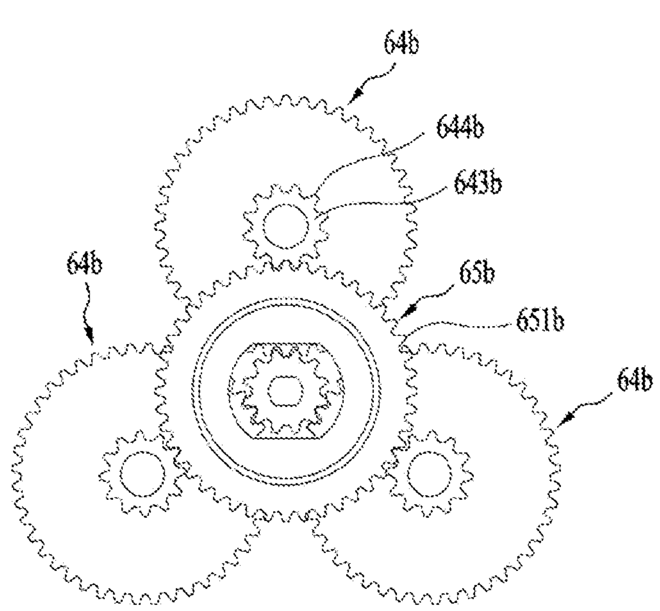
FIG. 10 is a simplified view illustrating the gear unit in the driving unit according of FIG. 7.

Referring to FIGS. 9 and 10, in some implementations, the driving gear 631*b* of the first shaft 63*b* can be located in a space defined among the first gears 642*b*. Further, the free end of the first shaft support 673*b* can be inserted into the first shaft support hole 672*b* formed at the center of the carrier cover 671*b* to pass through the first shaft through-hole 612*b* of housing 60*b*. This structure can minimize the volumes of the carrier 67*b* and the housing 60*b*.

To seal the fixing panel through-hole 155 (to prevent air supplied to the drum 20 from leaking to the outside of the cabinet 1), the driving unit bracket 4 or the fixing panel 15 can be further provided with the seal 41. When the driving unit bracket 4 is shaped into a ring surrounding the fixing panel through-hole 155, the ring-shaped core 511 is fixed to the driving unit bracket 4, and the housing 60*b* is located in the core through-hole 512, the seal 41 can seal the space defined between the driving unit bracket 4 and the second housing 62*b*.

The driving unit D having the above-described structure can operate as follows. Referring to FIG. 10, when the rotor 52 rotates clockwise, the first shaft 63*b* and the driving gear 631*b* also rotate clockwise.

When the driving gear 631*b* rotates clockwise, the interlocking gears 64*b* are rotated counterclockwise by the first gears 642*b*. When the first gears 642*b* rotate counterclockwise, the second gears 644*b* also rotate counterclockwise.

Because the interlocking gears 64*b* are rotatably supported inside the housing 60*b*, when the second gears 644*b* rotate counterclockwise, the driven gear 65*b* rotates clockwise.

The drum 20 and the driven gear 65*b* are coupled by the second shaft 652*b*. Therefore, the drum 20 rotates in the same direction as the rotor 52.

As illustrated in the drawing, the diameter of each of the first gears 642*b* can be set to be larger than the diameter of the driving gear 631*b*, and the diameter of each of the second gears 644*b* can be set to be smaller than the diameter of each of the first gears 642*b*.

When the first gears 642*b*, the second gears 644*b*, and the driving gear 631*b* are provided as described above, the driving unit D can rotate the drum 20 with a smaller number of revolutions than that of the rotor 52. That is, the driving unit D can also serve as a decelerator.

As described above, in the power transmitter 6, as the driving gear 631*b* meshed with the first gears 642*b* of the interlocking gears 64*b* is even with the first gears 642*b*, and the driven gear 65*b* meshed with the second gears 644*b* of the interlocking gears 64*b* are even with the second gears 644*b*, the installation volume of the driving gear 631*b*, the interlocking gears 64*b*, and the driven gear 65*b* in the housing 60*b* can be minimized.

In some implementations, in the state where the driving gear 631*b* of the first shaft 63*b* is meshed with the first gears 642*b* of the interlocking gears 64*b*, and the driven gear 65*b* with the second shaft 652*b* formed thereon is meshed with the second gears 644*b* of the interlocking gears 64*b*, the first shaft 63*b* and the second shaft 652*b* are coaxially coupled with each other in the carrier 67*b*. Therefore, when rotation of the first shaft 63*b* is transferred from the interlocking gears 64*b* to the driven gear 65*b*, eccentricity can be prevented between the first shaft 35*b* and the driven gear 65*b*.

In some implementations, the first shaft 63*b* provided with the driving gear 631*b*, the interlocking gears 64*b*, and the driven gear 65*b* provided with the second shaft 652*b* assembled in the carrier 67*b* are coupled with the inside of the housing 60*b*, and the housing 60*b* is fixed to the fixing panel 15 by the driving unit bracket 4. Therefore, the assembly process of the driving unit D can be simplified.

Figure 11:
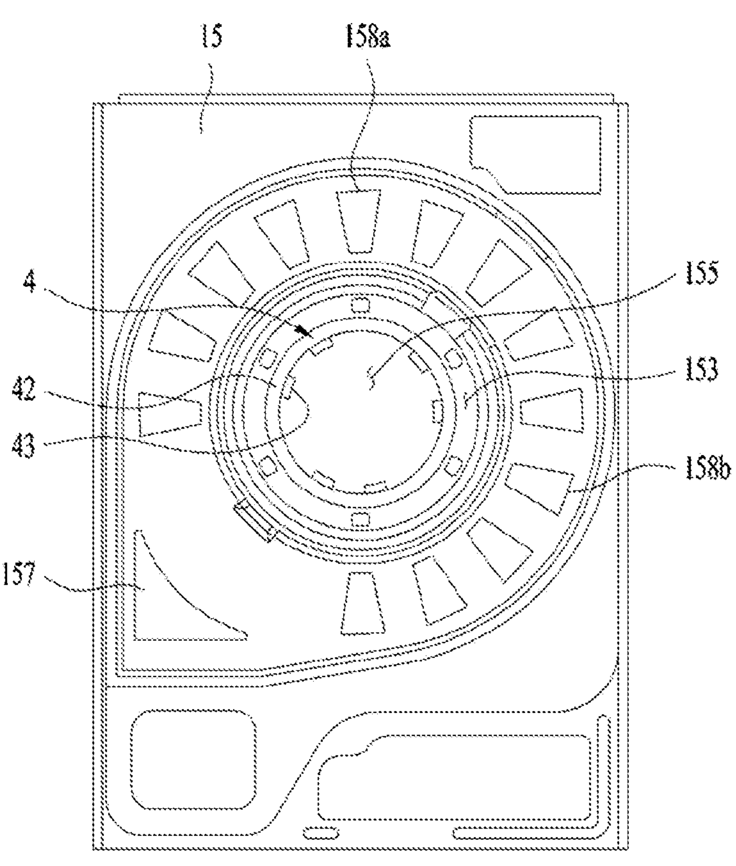
FIG. 11 is a rear view illustrating an example of a driving unit bracket.
Figure 12:
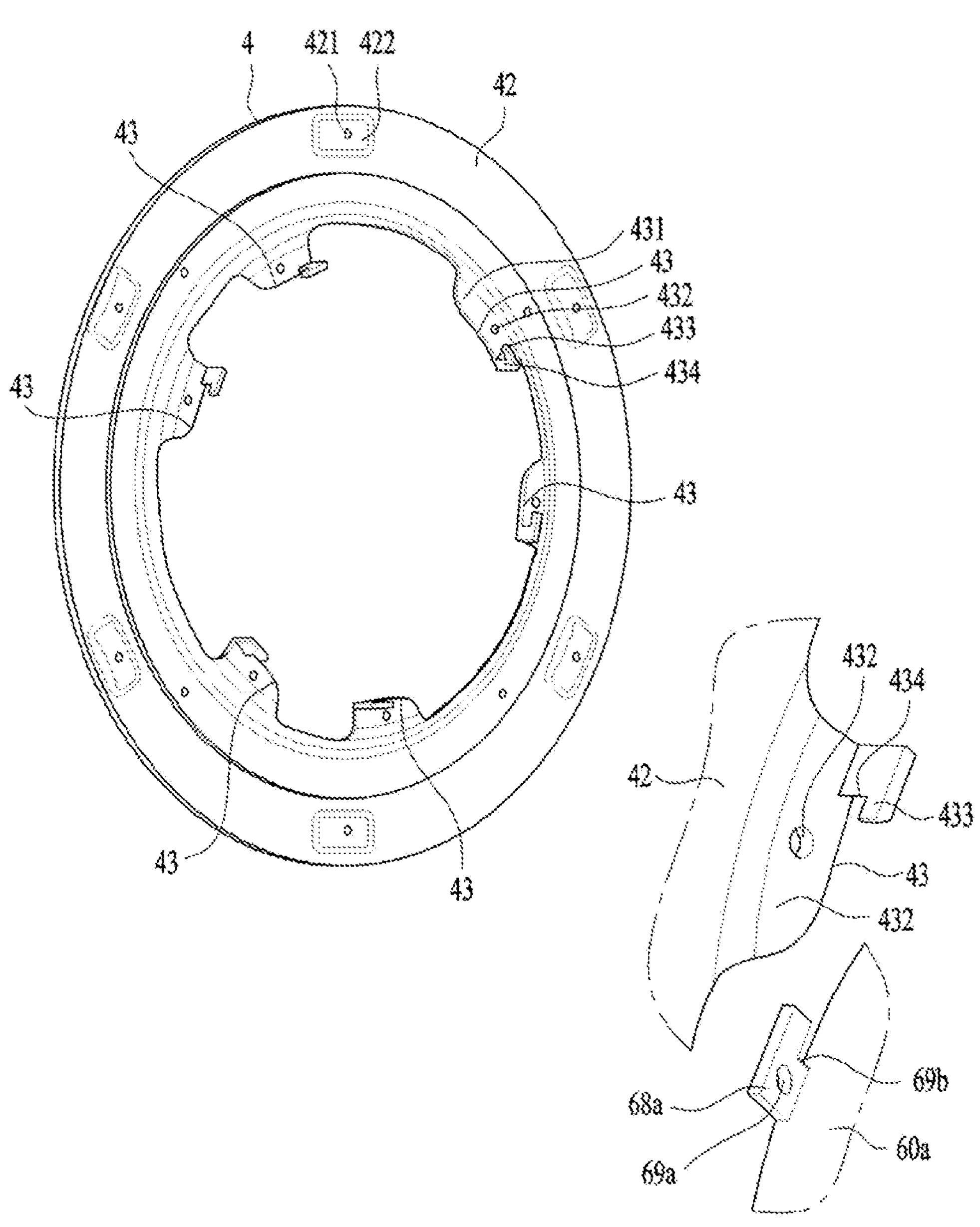
FIG. 12 is a perspective view illustrating the driving unit bracket.

The driving unit bracket 4 is coupled in the driving unit mounting recess 153 to minimize deformation of the fixing panel 15 by the weight of the driving unit D and an external force generated during operation of the driving unit D, as illustrated in FIGS. 11 to 12.

The motor 5 and the power transmitter 6 fixed to the driving unit bracket 4 can be coupled with each other by the driving unit D, so that the motor 5 and the power transmitter 6 have a coaxial rotation axis. That is, the power transmitter 6 can be coupled at the center of the driving unit bracket 4, and an outer portion of the stator 51 can be coupled with an outer portion of the driving unit bracket 4 by a separate coupling member.

The driving unit bracket 4 can include motor coupling holes 421 coupled with the stator 51 with the fixing panel 15 interposed therebetween, a ring portion 42 defining an installation space for the housing 60*a* or 60*b* at center, and housing coupling portions 43 protruding from an inner circumferential surface of the ring portion 42 to receive and fix the housing 60*a* or 60*b*.

The ring portion 42 can include protrusions 422 protruding from the rear of the fixing panel 15 toward the stator 51 so that the motor coupling holes 421 form a coupling tolerance with the stator 51. The motor coupling holes 421 can be formed in the protrusions 422. Accordingly, the driving unit bracket 4 and the stator 51 can be coupled with the fixing panel 15 in the order of the protrusions 422, the driving unit mounting recess 153, and the stator 51.

Housing fixing protrusions 68*a* corresponding to the housing coupling portions 43 can protrude from the outer surface of the housing 60*a* or 60*b* of the power transmitter 6. The housing fixing protrusions 68*a* are formed with the same radius around the rotation axis of the second shaft 652*a* or 652*b* of the housing 60*a* or 60*b*. Housing fixing holes 69*a* are formed in the housing fixing protrusions 68*a*, to allow separate fastening members to be inserted therein.

A plurality of housing coupling portions 43 and a plurality of housing fixing protrusions 68*a* can be provided in a one-to-one correspondence. At least three pairs of housing coupling portions 43 and housing fixing protrusions 68*a* can be provided.

The motor coupling holes 421 and the housing coupling portions 43 can be arranged with the same radius around the rotation axis of the second shaft 652*a* or 652*b* of the housing 60*a* or 60*b*. Accordingly, the stator 51 of the motor 5 coupled with the motor coupling holes 421 and the second shaft 652*a* or 652*b* of the housing 60*a* or 60*b* coupled with the housing coupling portions 43 can be coupled with the driving unit bracket 4 so as to have the same center axis.

Each of the housing coupling portions 43 is provided with a housing coupling jaw 431 protruding from the inner circumferential surface of the ring portion 42, and a locking protrusion 433 bent from the housing coupling jaw 431 in a direction opposite to a direction in which the housing 60*a* or 60*b* is inserted.

In each of the housing coupling portions 43, a housing coupling hole 432 corresponding to a housing fixing hole 69*a* is formed, on which the front surface of the second housing 62*a* or 62*b* is mounted. A separate coupling member can be fixedly inserted into the housing coupling hole 432 and the housing fixing hole 69*a*.

A locking groove 434 is formed on each of the locking protrusions 433, to allow a housing fixing protrusion 68*a* to be inserted therethrough. The locking groove 434 is formed in the lateral direction of the locking protrusion 433. As the housing 60*a* or 60*b* is mounted in the driving unit bracket 4 and then rotates around its center, the housing fixing protrusion 68*a* can be inserted into the locking groove 434.

The housing fixing protrusion 68*a* can have a housing fixing groove 69*b* formed thereon at a position corresponding to the locking groove 434. As the housing fixing groove 69*b* is crossly inserted in the locking groove 434, the housing 60*a* or 60*b* can be fixed to the driving unit bracket 4.

The housing fixing groove 69*b* can be formed in the form of an inclined surface with an extended entrance. As the housing fixing groove 69*b* is crossly inserted in the locking groove 434, from the inlet of the housing fixing groove 69*b* to the inside of the housing fixing groove 69*b*, the positions of the housing 60*a* or 60*b* can move and be fixed to the center of the driving unit bracket 4.

The strength of the fixing panel 15 can be reinforced by coupling the driving unit bracket 4 in the driving unit mounting recess 153. At the same time, when the housing 60*a* or 60*b* is coupled with the driving unit bracket 4, the installation position of the housing 60*a* or 60*b* can be corrected to the center of the driving unit bracket 4. In addition, the rotation axes of the motor 5 and the power transmitter 6 can become coaxial by coupling the stator 51 of the motor 5 and the housing 60*a* or 60*b* of the power transmitter 6 with the driving unit bracket 4.

Figure 13:
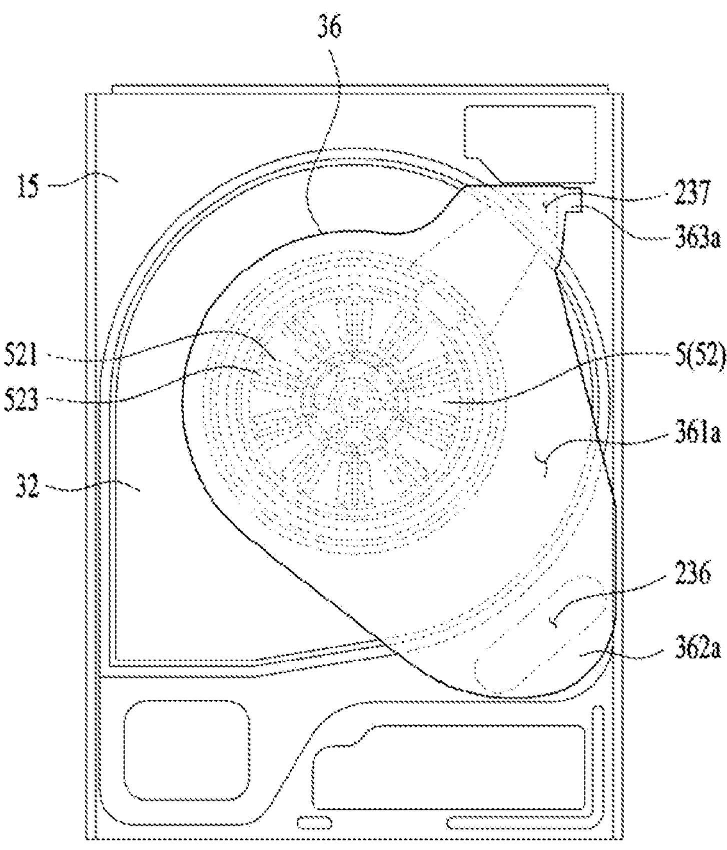
FIG. 13 is a rear view illustrating an example of a driving unit cooling structure.

The rear cover 23 of the drum 20 can be provided with a plurality of supply holes 158*a* and 158*b* arranged in the shape of a ring. As illustrated in FIGS. 2 and 13, the dryer 100 can further include a flow guide 324 for evenly supplying air discharged from the second exhaust port 157 to the supply holes 158*a* and 158*b*.

Because air moves to a location having a smaller flow resistance, in the case of a dryer 100 without the flow guide 324, the air introduced into the duct body 321 through the second exhaust port 157 flows into the duct body 321 along the clockwise direction at a different amount from the air flowing into the duct body 321 along the counterclockwise direction.

For example, when more air flows into the duct body 321 along the clockwise direction than along the counterclockwise direction, a large amount of air is supplied to the supply holes 158*a* on the left side of a reference line L, whereas a small amount of air is supplied to the supply holes 158*b* on the right side of the reference line L.

The above-described imbalance in the amount of air supply can cause an imbalance in the amount of air supplied to clothes in the drum 20. That is, the phenomenon that the amount of supplied air varies depending on the location of the clothes can cause a problem in that a drying time increases, and some clothes become over-dried while other clothes become under-dried.

The flow guide 324 can maintain the amount of air flowing into the duct body 321 along the clockwise direction to be equal or similar to the amount of air flowing into the duct body 321 along the counterclockwise direction, thereby solving the above problem. That is, this is because some of the air introduced into the duct body 321 by the flow guide 324 moves to the supply holes 158*a* located on the left side of the flow guide 324, and the rest of the air moves to the supply holes 158*b* on the right side of the flow guide 324.

In the dryer 100 having the above structure, the duct body 321 surrounds the motor 5 (because the motor 5 is located inside the rotor accommodator). Therefore, the motor 5 is likely to be overheated.

For effective cooling of the motor 5 (specifically, for cooling of the stator 51), a cooling passage can be further provided in the dryer 100.

Figure 14:
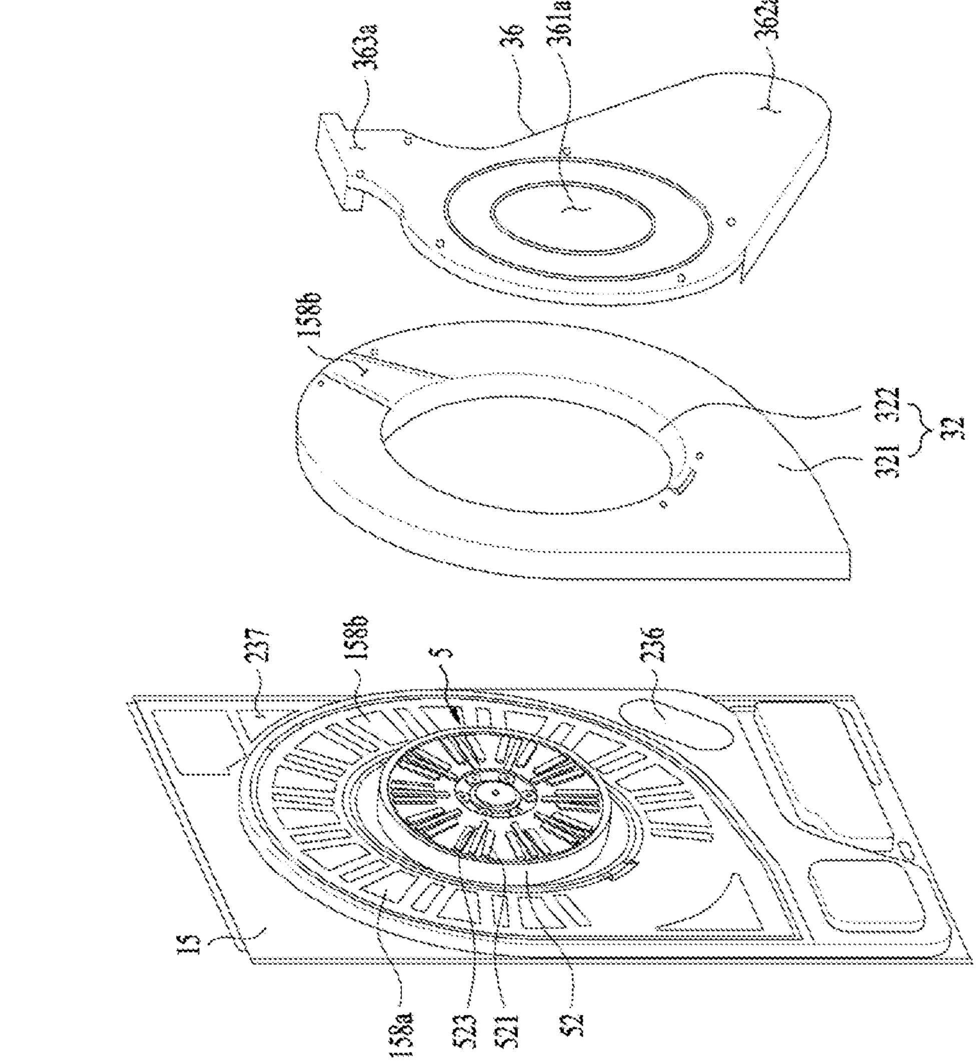
FIG. 14 is a perspective view illustrating the driving unit cooling structure.

FIGS. 13 and 14 illustrate the cooling passage. As illustrated, the cooling passage is for cooling the motor 5 by circulating air in the cabinet 1 with the motor 5.

The cooling passage can include a first cooling hole 236 formed under the rear cover 23 to penetrate through the cabinet 1, a second cooling hole 237 formed above the rear cover 23 to penetrate through the cabinet 1, and a duct cover 36 fixed to the exterior of the duct body 321 to communicate the first cooling hole 236 and the second cooling hole 237 with the rotor accommodator 322.

The first cooling hole 236 and the second cooling hole 237 penetrate through the rear cover 23 to circulate air in the rotor accommodator 322 and air inside the cabinet 1 and thus cool the motor 5 of the rotor accommodator 322.

The duct cover 36 can include a cover plate 361*a* covering the rotor accommodator 322, a first cooling duct 362*a* extending toward the first cooling hole 236, under the cover plate 361*a*, and a second cooling duct 363*a* extending to the second cooling hole 237, above the cover plate 361*a*.

That is, the duct cover 36 is coupled with the exterior of the duct body 321, to form a flow path in which the air inside the cabinet 1 flows to the first cooling hole 236, the rotor accommodator 322, and the first cooling hole 236.

Air inside the cabinet 1 is at a lower temperature than air drying the clothes inside the drum 20 by the heat exchange unit 34 and the supply duct 32, and flows to the rotor accommodator 322 through the cooling passage, thereby cooling the motor 5.

In some implementations, the base panel 17 can include a separate exhaust fan for discharging the air from the inside of the cabinet 1 to the outside of the cabinet 1 in order to cool heat generated from the compressor 345. Since the heated high-temperature air inside the cabinet 1 is discharged to the outside of the cabinet 1 by the exhaust fan, the air inside the cabinet 1 can be at a lower temperature than the air inside the heat exchanger 34, the supply duct 32, and the drum 20.

To facilitate discharge of air introduced from the first cooling duct 362*a* through the second cooling duct 363*a* and at the same time, effectively cool the motor 5, the rotor 52 can be further provided with a plurality of vanes 523.

Each of the vanes 523 can be provided as a board protruding from the rotor body 52*a* toward the duct cover 36. The vane 523 can be provided as a single plate or as a plurality of plates. In any case, the vanes 523 are preferably provided parallel to the radial direction of the rotor body 52*a*.

When the vanes 523 are provided as plates parallel to the radial direction of the rotor body 52*a*, the vanes 523 can function as an impeller that forcibly moves air in the rotor accommodator 322 during rotation of the rotor 52.

The rotor 52 can further include a rotor through-hole 521 penetrating the rotor body 52*a* to more effectively discharge heat generated in the stator 51 to the rotor accommodator 322. A plurality of rotor through-holes 521 can be arranged in a ring surrounding the first shaft 63*a* or 63*b*.

Each of the rotor through-holes 521 can be provided as a slit having a length in the radial direction of the rotor body 52*a* set longer than a length in the circumferential direction of the rotor body 52*a*. In this case, each of the vanes 523 can be fixed to the edge of a rotor through-hole 521 parallel to the radial direction of the rotor body 52*a*.

To more effectively cool the motor 5, the first cooling duct 362*a*, the center of rotation of the rotor 52, and the second cooling duct 363*a* can be arranged to extend on a single straight line.

Accordingly, when the rotor 52 rotates, external air is introduced into the rotor accommodator 322 through the first cooling hole 236 and the first cooling duct 362*a*. The air introduced into the rotor accommodator 322 cools the motor 5 and then is discharged to the outside of the rotor accommodator 322 through the second cooling duct 363*a* and the second cooling hole 237.

Figure 15:
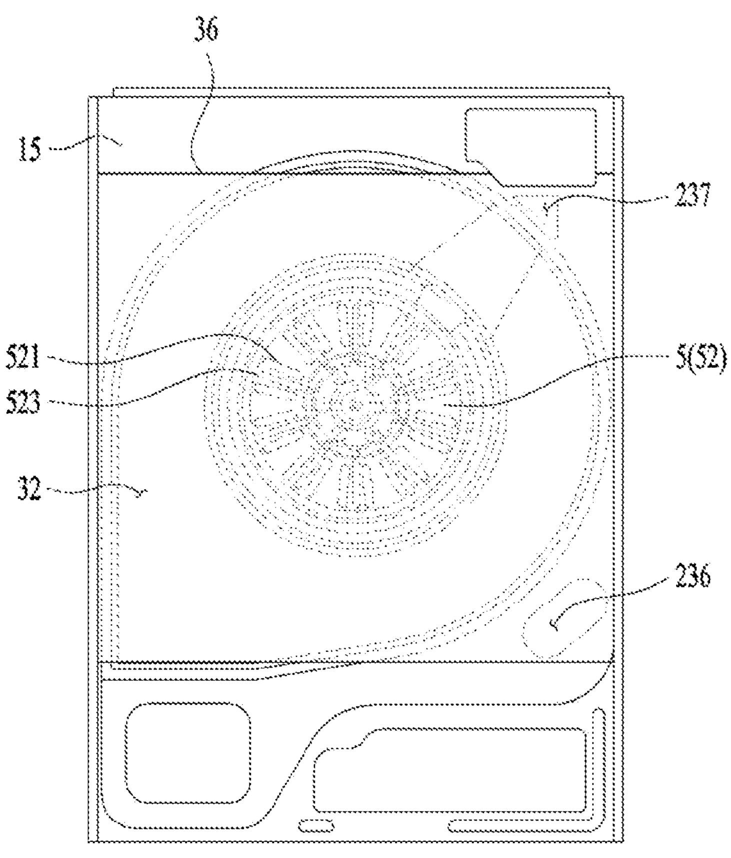
FIG. 15 is a rear view illustrating an example of a driving unit cooling structure.
Figure 16:
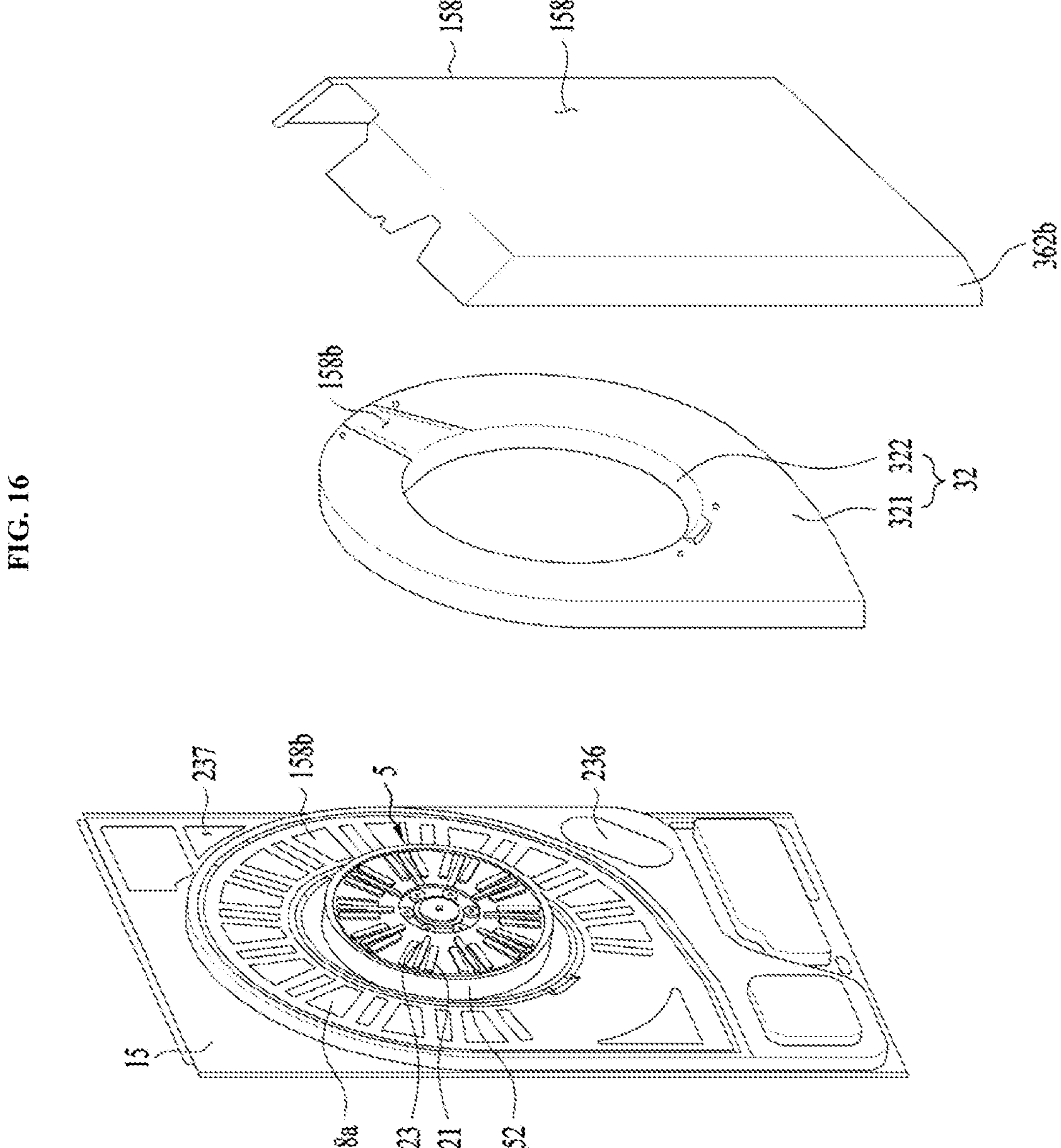
FIG. 16 is a perspective view illustrating an example of a driving unit cooling structure.

FIGS. 15 and 16 illustrate a cooling passage. As illustrated, a predetermined portion of the fixing panel 15 is formed as the cooling passage to cool the motor 5.

The duct cover 36 is formed in the form of an enclosure having an open surface facing the supply duct 32 to cover the entire supply duct 32. The supply duct 32 is formed in the shape of a ring along the arrangement of the supply port 158 of the fixing panel 15, and the duct cover 36 is formed in a rectangle to cover the outer portion of the supply duct 32.

When the duct cover 36 covers the supply duct 32, a space is formed between the outer circumferential surface of the supply duct 32 and the inner corners of the duct cover 36, and the first cooling hole 236 and the second cooling hole 237 are formed at positions of the fixing panel 15 corresponding to inner corners of the duct cover 36.

The duct cover 36 can be provided with a cover plate 361*b* having a larger area than an area formed by the supply duct 32, the first cooling hole 236, and the second cooling hole 237, and a cover sidewall 362*b* fixed to the fixing panel 15 at a height higher than the supply duct 32, on the outer circumferential surface of the cover plate 361*b*.

The first cooling hole 236 and the second cooling hole 237 can communicate with each other by the cover plate 361*b* and the cover sidewall 362*b*, and the motor 5 provided in the rotor accommodator 322 can be cooled by air passing through the first cooling hole 236 and the second cooling hole 237.

The first cooling hole 236 and the second cooling hole 237 serve as a passage through which the air inside the cabinet 1 flows. The first cooling hole 236 can be formed on a lower part of the fixing panel 15, and the second cooling hole 237 can be formed on an upper part of the fixing panel 15. The first cooling hole 236 and the second cooling hole 237 allow the air in the cabinet 1 to flow into the duct cover 36. The first cooling hole 236 and the second cooling hole 237 can be formed at opposite corners with respect to the center of the supply duct 32.

To effectively cool the motor 5 while facilitating discharge of air introduced from the first cooling hole 236 through the second cooling hole 237, the rotor 52 can further include the plurality of vanes 523 serving as an impeller during rotation of the rotor 52, and the rotor through-hole 521 penetrating through the rotor body 52*a*. Since the vanes 523 and the rotor through-hole 521 have been described above, a detailed description thereof will not be provided herein.

A circulation fan can be further provided in one of the first cooling hole 236 and the second cooling hole 237 to forcibly circulate air in the cabinet 1 in the duct cover 36. When the circulation fan is provided, the motor 5 can be cooled more effectively.

While the dryer 100 has been described above in the context of a circulation-type drying system, the dryer 100 can also be applied to an exhaust-type drying system. The circulation-type drying system refers to a drying scheme in which air discharged from the drum 20 is dehumidified and heated sequentially, and then high-temperature dry air is re-supplied to the drum 20. The exhaust-type drying system refers to a drying scheme in which external air is heated and supplied to the drum 20, and after heat exchange, air discharged from the drum 20 is exhausted to the outside of the cabinet 1.

When the dryer 100 is provided as the exhaust-type drying system, the supply 3 can include an exhaust duct connecting the first exhaust port 128 and the second exhaust port 157, a supply duct supplying external air (air inside or outside the cabinet) to the drum 20, and a heat exchange unit heating the air introduced into the supply duct.

As is apparent from the foregoing description, the present disclosure can provide a dryer with a driving unit in which the rotation speed of a rotor is reduced and transmitted to a drum, and the rotation center of the rotor and the rotation center of the drum are located on a concentric axis.

Further, the present disclosure can provide a dryer in which the volume of a driving unit can be minimized.

Further, the present disclosure can provide a dryer with an improved flow path of air supplied to a drum.

Further, the present disclosure can provide a dryer with an improved cooling passage for a motor driving a drum.

Further, the present disclosure can provide a dryer with an improved fixing structure for fixing a motor and a power transmitter.

Further, the present disclosure can provide a dryer in which vibrations generated in a power transmitter transferring the power of a motor can be reduced.

The above description is merely illustrative of the technical idea of the present disclosure. It will be apparent to those skilled in the art that various modifications and variations can be made in the present disclosure without departing from the spirit or scope of the disclosures.

Therefore, the above detailed description is to be construed in all aspects as illustrative and not restrictive. The scope of the disclosure should be determined by the appended claims and their legal equivalents, not by the above description, and all changes coming within the meaning and equivalency range of the appended claims are intended to be embraced therein.

What is claimed is:

1. A dryer comprising:
- a drum comprising:
  - a drum body that defines a space configured to receive clothes,
  - a front cover that defines a front surface of the drum body, the front cover defining a drum inlet in communication with the space of the drum body, and
  - a rear cover that defines a rear surface of the drum body;
- a fixing panel spaced apart from the rear cover, the fixing panel defining a panel through-hole;
- a motor comprising a stator disposed in the panel through-hole and a rotor configured to rotate relative to the stator;
- a power transmitter comprising:
  - a housing fixed to the fixing panel,
  - a first shaft located at the housing and coupled to the rotor,
  - a second shaft located at the housing and coupled to the rear cover, and
  - an interlocking gear located in the housing and configured to decelerate a rotational speed of the first shaft, the interlocking gear being configured to transmit rotational force from the first shaft to the second shaft; and
- a driving unit bracket that is disposed at the panel through-hole, the driving unit bracket being coupled to a surface of the fixing panel and configured to reinforce the fixing panel,
- wherein the fixing panel is located between the drum and the motor in an axial direction of the first shaft,
- wherein the fixing panel is located between the driving unit bracket and the stator, and
- wherein the driving unit bracket and the fixing panel support the stator.

2. The dryer according to claim 1, wherein the driving unit bracket comprises:
- a ring portion that overlaps with a circumferential surface of the panel through-hole, that is fixed to the fixing panel, and that supports the stator; and
- a housing coupling portion that protrudes from an inside of the ring portion and supports an exterior of the housing.

3. The dryer according to claim 2, wherein the ring portion defines a plurality of coupling holes that face the circumferential surface of the panel through-hole, and wherein the stator passes through the fixing panel and is fixed to the plurality of coupling holes.

4. The dryer according to claim 3, wherein the ring portion comprises a protrusion that extends through the panel through-hole and protrudes toward the fixing panel.

5. The dryer according to claim 2, wherein the housing comprises a plurality of fixing protrusions that are located at an outer circumferential surface of the housing and extend in a radial direction with respect to a center of the housing, and wherein the housing coupling portion comprises a plurality of housing coupling jaws that protrude toward a center of the ring portion, each of the plurality of housing coupling jaws being located at a position corresponding to one of the plurality of fixing protrusions.

6. The dryer according to claim 5, wherein each of the plurality of housing coupling jaws defines a housing coupling hole, and wherein each of the plurality of fixing protrusions defines a fixing hole coupled with one of the housing coupling holes by a coupling member.

7. The dryer according to claim 6, wherein the plurality of housing coupling jaws comprise a plurality of locking protrusions, respectively, each of the plurality of locking protrusions extending in an insertion direction of the housing, and wherein each of the plurality of fixing protrusions is supported by one of the plurality of locking protrusions and extends in a direction crossing the one of the plurality of locking protrusions.

8. The dryer according to claim 7, wherein each of the plurality of locking protrusions defines a locking groove that receives one of the plurality of fixing protrusions.

9. The dryer according to claim 7, wherein each of the plurality of fixing protrusions defines a fixing groove that receives one of the plurality of housing coupling jaws.

10. The dryer according to claim 7, wherein the plurality of locking protrusions define a plurality of locking grooves, respectively, each of the plurality of locking grooves receiving one of the plurality of fixing protrusions, and wherein the plurality of fixing protrusions define a plurality of fixing grooves, respectively, each of the plurality of fixing grooves being coupled to one of the plurality of locking grooves.

11. The dryer according to claim 5, wherein a number of the plurality of fixing protrusions is greater than or equal to three, and wherein a number of the plurality of housing coupling jaws is greater than or equal to three.

12. The dryer according to claim 1, wherein the power transmitter further comprises:

a driving gear defined at an end of the first shaft and configured to transmit the rotational force to the interlocking gear; and a driven gear defined at an end of the second shaft and configured to receive the rotational force from the interlocking gear, and wherein the interlocking gear comprises:

a first gear meshed with the driving gear and configured to be rotated by the driving gear, and a second gear meshed with the driven gear and configured to rotate coaxially with the first gear, a diameter of the second gear being less than a diameter of the first gear.

13. The dryer according to claim 1, wherein the first shaft, the second shaft, and the rotor are coaxial.

14. The dryer according to claim 1, wherein a peripheral surface of the housing includes a flat portion and a curved portion that extends from the flat portion, and wherein the driving unit bracket defines a recess corresponding to the flat portion and the curved portion of the housing.

15. The dryer according to claim 14, wherein the driving unit bracket further defines a bracket through-hole within the recess, the bracket through-hole being in communication with the panel through-hole.

16. The dryer according to claim 2, further comprising a sealing that is located at the driving unit bracket or the fixing panel and that covers the circumferential surface of the panel through-hole.

17. The dryer according to claim 16, wherein the power transmitter is located between the sealing and the motor along a rotation axis of the rotor.

18. A dryer comprising:

a drum comprising:

a drum body that defines a space configured to receive clothes, a front cover that defines a front surface of the drum body, the front cover defining a drum inlet in communication with the space of the drum body, and a rear cover that defines a rear surface of the drum body;

a fixing panel spaced apart from the rear cover, the fixing panel defining a panel through-hole;

a motor comprising a stator disposed in the panel through-hole and a rotor configured to rotate relative to the stator;

a power transmitter comprising:

a housing fixed to the fixing panel, a first shaft located at the housing and coupled to the rotor, a second shaft located at the housing and coupled to the rear cover, and an interlocking gear located in the housing and configured to decelerate a rotational speed of the first shaft, the interlocking gear being configured to transmit rotational force from the first shaft to the second shaft; and a driving unit bracket that is disposed at the panel through-hole, the driving unit bracket being coupled to a surface of the fixing panel and configured to reinforce the fixing panel, wherein the fixing panel is located between the driving unit bracket and the stator.

19. A dryer comprising:

a drum comprising:

a drum body that defines a space configured to receive clothes, a front cover that defines a front surface of the drum body, the front cover defining a drum inlet in communication with the space of the drum body, and a rear cover that defines a rear surface of the drum body;

a fixing panel spaced apart from the rear cover, the fixing panel defining a panel through-hole;

a motor comprising a stator disposed in the panel through-hole and a rotor configured to rotate relative to the stator;

a power transmitter comprising:

a housing fixed to the fixing panel, a first shaft located at the housing and coupled to the rotor, a second shaft located at the housing and coupled to the rear cover, and an interlocking gear located in the housing and configured to decelerate a rotational speed of the first shaft, the interlocking gear being configured to transmit rotational force from the first shaft to the second shaft; and a driving unit bracket that is disposed at the panel through-hole, the driving unit bracket being coupled to a surface of the fixing panel and configured to reinforce the fixing panel, wherein the surface of the fixing panel faces the drum, and wherein the driving unit bracket comprises:

a ring portion that overlaps with a circumferential surface of the panel through-hole, that is fixed to the fixing panel, and that supports the stator, and a housing coupling portion that protrudes from an inside of the ring portion and supports an exterior of the housing.

* * * * *